United States Patent
Qian et al.

(10) Patent No.: US 10,986,673 B2
(45) Date of Patent: Apr. 20, 2021

(54) METHOD OF DETERMINING FREQUENCY-DOMAIN OFFSET PARAMETER, USER EQUIPMENT (UE), RANDOM ACCESS METHOD, METHOD FOR CONFIGURING RANDOM ACCESS INFORMATION, CORRESPONDING DEVICE AND COMPUTER READABLE MEDIUM

(71) Applicant: Samsung Electronics Co., Ltd., Suwon-si (KR)

(72) Inventors: Chen Qian, Beijing (CN); Qi Xiong, Beijing (CN); Bin Yu, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 93 days.

(21) Appl. No.: 16/245,850

(22) Filed: Jan. 11, 2019

(65) Prior Publication Data
US 2019/0215877 A1   Jul. 11, 2019

(30) Foreign Application Priority Data

Jan. 11, 2018  (CN) .......................... 201810027186.8
Jan. 19, 2018  (CN) .......................... 201810057947.4

(51) Int. Cl.
*H04W 74/08* (2009.01)
*H04L 27/26* (2006.01)
*H04L 27/00* (2006.01)

(52) U.S. Cl.
CPC ..... *H04W 74/0858* (2013.01); *H04L 27/0014* (2013.01); *H04L 27/2659* (2013.01);
(Continued)

(58) Field of Classification Search
CPC ............. H04L 27/0014; H04L 27/2659; H04L 27/2666; H04L 27/26; H04W 74/0858; H04W 72/04; H04W 74/08
See application file for complete search history.

(56) References Cited

U.S. PATENT DOCUMENTS

2013/0242730 A1   9/2013  Pelletier et al.
2016/0286578 A1*  9/2016  Bertrand ............... H04L 5/0055
(Continued)

OTHER PUBLICATIONS

International Search Report dated Apr. 19, 2019, issued in an International application No. PCT/KR2019/000506.
(Continued)

*Primary Examiner* — Anez C Ebrahim
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). A method of determining a frequency-domain offset parameter of a preamble in a random access channel and a corresponding user equipment (UE) is provided. The method includes obtaining a random access channel subcarrier spacing $\Delta f_{RA}$, a preamble length $L_{RA}$ and a uplink (UL) channel subcarrier spacing $\Delta f$ from a base station and determining a frequency-domain offset parameter $\bar{k}$ of a preamble in a random access channel based on the obtained random access channel subcarrier spacing $\Delta f_{RA}$, preamble length $L_{RA}$ and UL channel subcarrier spacing $\Delta f$. Other embodiments of the disclosure further provide a random access method, a method for configuring random access information and related device, and a corresponding computer readable medium.

15 Claims, 14 Drawing Sheets

(52) U.S. Cl.
CPC .. *H04L 27/2666* (2013.01); *H04L 2027/0065* (2013.01); *H04L 2027/0095* (2013.01); *H04W 74/0833* (2013.01)

(56) References Cited

U.S. PATENT DOCUMENTS

2017/0006637 A1    1/2017    Sahlin et al.
2017/0265230 A1    9/2017    Liu et al.

OTHER PUBLICATIONS

Huawei et al., 'Remaining issues in RACH formats', R1-1719375, 3GPP TSG RAN WG1 Meeting #91, Sections 2-2.1; and table 5; Nov. 18, 2018; Reno, USA.

Mediatek Inc., 'Remaining details on RACH procedure', R1-1719569, 3GPP TSG RAN WG1 Meeting #91, Section 5; Nov. 18, 2017; Reno, USA.

Intel Corporation, 'Remaining details of PRACH formats', R1-1720061, 3GPP TSG RAN WG1 Meeting #91, Sections 1-2.4; Nov. 18, 2017; Reno, USA.

Extended European Search Report dated Nov. 17, 2020, issued in a counterpart European Application No. 19738844.0-1231/3698595.

\* cited by examiner

METHOD OF DETERMINING FREQUENCY-DOMAIN OFFSET PARAMETER, USER EQUIPMENT (UE), RANDOM ACCESS METHOD, METHOD FOR CONFIGURING RANDOM ACCESS INFORMATION, CORRESPONDING DEVICE AND COMPUTER READABLE MEDIUM

CROSS-REFERENCE TO RELATED APPLICATION(S)

This application is based on and claims priority under 35 U.S.C. § 119(a) of a Chinese patent application number 201810027186.8, filed on Jan. 11, 2018, in the Chinese Patent Office, and of a Chinese patent application number 201810057947.4, filed on Jan. 19, 2018, in the Chinese Patent Office, the disclosure of each of which is incorporated by reference herein in its entirety.

BACKGROUND

1. Field

The disclosure relates to wireless communication technology. More particularly, the disclosure relates to a method of determining a frequency-domain offset parameter, a user equipment (UE), a random access method, a method for configuring random access information, a corresponding device and a computer readable medium related thereto.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With the rapid development of the information industry, especially a growing demand from mobile Internet and Internet of things (IoT), unprecedented challenges have been brought to the future mobile communication technology. For example, according to the report ITU-R M. [IMT.BEYOND 2020.TRAFFIC] of the international telecommunication union (ITU), it may be expected that by 2020, the amount of mobile traffic will increase by nearly 1,000 times relative to that in 2010 (fourth generation (4G) era), and the number of connected UEs will exceed 17 billion. As massive IoT devices gradually penetrate into the mobile communication network, the number of connected devices will be even more remarkable. In response to the unprecedented challenge, the communications industry and academia have developed extensive $5^{th}$ generation (5G) mobile communications technology researches for the 2020's. In the current ITU report ITU-R M. [IMT.VISION], the future 5G framework and overall objectives have already been discussed, in which the 5G demand outlook, application scenarios, and various important performance indicators are described in detail. For new requirements in 5G, the ITU report ITU-R M. [IMT.FUTURE TECHNOLOGY TRENDS] provides information related to 5G technology trends, aiming to address significant issues associated with increase in system throughput, user experience consistency, scalability for IoT support, latency, energy efficiency, cost, network flexibility, support for emerging services, and flexible spectrum utilization etc.

A random access process is important means for user equipment (UE) access. After the UE has completed downlink (DL) synchronization based on a DL synchronization signal, it needs to enter the random access process, in order to complete registration in a cell and obtain an uplink (UL) timing advance instruction to complete UL synchronization. The random access may be classified as contention-based random access and contention-free random access based on whether or not the UE associated with preamble resources exclusively. Since in the contention-based random access, respective UEs select respective preambles from the same preamble resources in a process of trying to establish UL links, several UEs may select the same preamble to be transmitted to the base station. Thus, a conflict resolution mechanism is an important research direction in the random access. How to reduce a conflict probability and how to rapidly resolve a conflict which has occurred are key indicators that affect the random access performance.

FIG. 1 illustrates a schematic diagram of a contention-based random access process according to the related art.

Referring to FIG. 1, the contention-based random access process in long term evolution-advanced (LTE-A) includes four operations. Before the random access process starts, the base station transmits configuration information of the random access process to the UE, and the UE performs the random access process according to the received configuration information.

In operation 1, the UE randomly selects a preamble from a preamble resource pool and transmits it to the base station and the base station performs correlation detection on the received signal so as to identify the preamble transmitted by the UE.

In operation 2, the base station transmits a random access response (RAR) to the UE, the RAR including a random access preamble identifier, a timing advance instruction determined based on a delay estimation between the UE and the base station, a temporary cell-radio network temporary identifier (TC-RNTI), and time-frequency resources allocated for the next UL transmission of the UE.

In operation 3, the UE transmits a Message 3 (MSg3) to the base station according to the information in the RAR. The MSg3 includes information, such as a UE identifier for identifying a UE and a radio resource control (RRC) link request, etc. The UE identifier is an identifier unique to the UE for resolving conflicts.

In operation 4, the base station transmits a conflict resolution identifier to the UE, including the UE identifier of the UE that survives the conflict resolution. After detecting its own identifier, the UE upgrades a TC-RNTI to a cell-radio network temporary identifier (C-RNTI), and transmits an acknowledgement (ACK) signal to the base station to complete the random access process, and then waits for scheduling by the base station, otherwise, the UE will start a new random access process after a delay.

For the contention-free random access process, since the base station knows the UE identifier, it may allocate a preamble for the UE. Therefore, when the UE intends to transmit a preamble, it does not need to randomly select a preamble, but may use the allocated preamble. After detecting the allocated preamble, the base station may transmit a corresponding RAR, including information, such as timing advance and UL resource allocation etc. After receiving the RAR, the UE considers that UL synchronization has been completed and waits for further scheduling by the base station. Therefore, the process of initial access and the contention-free random access only include two operations First operation of transmitting a preamble and Second operation of transmitting an RAR.

In either a contention-based or contention-free random access, the first operations in initiating the random access is to transmit a preamble on the random access channel. In LTE, an equation for generating a baseband signal is given as $$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+\frac{1}{2}))\Delta f_{RA}(t-T_{CP})}$$

In the above equation, $\beta_{PRACH}$ is an amplitude adjustment factor calculated in a power control process, $N_{ZC}$ is a preamble length, $x_{u,v}(n)$ is a preamble, K is a factor for adjusting a difference between a random access channel subcarrier spacing and a UL channel subcarrier spacing, $\Delta f_{RA}$ is a random access channel subcarrier spacing, $k_0$ is a parameter for adjusting a frequency-domain position of a random access channel, $T_{CP}$ is a cyclic prefix length, and a parameter $\varphi$ is used to adjust a frequency-domain position of a random access preamble, so that its distances from two ends of a bandwidth of a UL shared channel are identical (i.e., guard periods on both sides of the preamble are identical), with its specific values shown in Table 1.

TABLE 1

| Values of Parameter $\varphi$ | | |
|---|---|---|
| Preamble Format | $\Delta f_{RA}$ | $\varphi$ |
| 0-3 | 1250 Hz | 7 |
| 4 | 7500 Hz | 2 |

It can be seen that the parameter $\varphi$ is directly associated with a random access channel subcarrier spacing.

For a 5G system, the subcarrier spacing supported by the system and the subcarrier spacing supported by the random access channel are more diversified. Specifically, the UL-supported subcarrier spacing includes 15/30/60/120 kHz, while the random access channel subcarrier spacing includes 1.25/5/15/30/60/120 kHz. Various combinations of the UL channel subcarrier spacing and the random access channel subcarrier spacing make adjustment of the preamble position more complex.

In the existing 5G technologies, the UL-supported subcarrier spacing and the subcarrier spacing supported by the random access channel are more diversified. A single or a few parameters used to adjust the frequency-domain position of the preamble cannot satisfy all possible combinations of the subcarrier spacing.

In addition, when there is a supplementary uplink in the system, the transmission flow of the existing random access preamble may be summarized as follows The terminal receives the random access configuration information carried by the master information block (MIB) carried in the broadcast channel or by the remaining minimum system information (RMSI) indicated in the MIB, as well as the threshold information for selecting the uplink. Subsequently, the terminal determines whether to select the supplementary uplink according to the reference signal received power (RSRP) of the downlink of the 5G system, that is, if the RSRP is less than the threshold information, then the supplementary uplink is selected to transmit the random access preamble, otherwise, the uplink of the 5G system is selected to transmit the random access preamble. Subsequently, the terminal determines the time-frequency resources of the random access channel according to the random access channel configuration information, and selects the preamble according to the random access preamble configuration information. Finally, the terminal transmits the preamble.

However, in the existing 5G technology, if the system selects the uplink of the 5G system according to the RSRP, or selects the supplementary uplink to transmit the random access preamble, then the subsequent random access reattempt will further be performed on the selected uplink, which will most likely cause the subsequent random access procedure to continue to fail due to the quality problem of the uplink channel, affecting the system performance, and further affecting the access experience of the terminal.

The above information is presented as background information only to assist with an understanding of the disclosure. No determination has been made, and no assertion is made, as to whether any of the above might be applicable as prior art with regard to the disclosure.

SUMMARY

The technical problem intended to be solved by the disclosure is that in the scheme of the related art, the parameters for adjusting the frequency-domain position of the preamble cannot satisfy various possible combinations of uplink (UL) shared channel subcarrier spacing and random access channel subcarrier spacing in $5^{th}$ generation (5G).

Aspects of the disclosure are to address at least the above-mentioned problems and/or disadvantages and to provide at least the advantages described below. Accordingly, an aspect of the disclosure is to provide a scheme of determining a frequency-domain offset parameter of a preamble in a random access channel, which are applicable to various combinations of subcarrier spacing.

Additional aspects will be set forth in part in the description which follows and, in part, will be apparent from the description, or may be learned by practice of the presented embodiments.

In accordance with an aspect of the disclosure, a method of determining a frequency-domain offset parameter of a preamble in a random access channel is provided. The method includes obtaining a random access channel subcarrier spacing $\Delta f_{RA}$, a preamble length $L_{RA}$ and a UL channel subcarrier spacing $\Delta f$ from a base station and determining a frequency-domain offset parameter $\bar{k}$ of a preamble in a random access channel based on the obtained random access channel subcarrier spacing $\Delta f_{RA}$, preamble length $L_{RA}$ and UL channel subcarrier spacing $\Delta f$.

In accordance with another aspect of the disclosure, a user equipment (UE) is provided. The UE includes a processor and a memory storing computer-executable instructions which, when executed by the processor, cause the processor to obtain a random access channel subcarrier spacing $\Delta f_{RA}$, a preamble length $L_{RA}$ and a UL channel subcarrier spacing $\Delta f$ from a base station and determine a frequency-domain offset parameter $\bar{k}$ of a preamble in a random access channel based on the obtained random access channel subcarrier spacing $\Delta f_{RA}$, preamble length $L_{RA}$ and UL channel subcarrier spacing $\Delta f$.

In an embodiment of the disclosure, the operation of determining the frequency-domain offset parameter $\bar{k}$ of the preamble in the random access channel further includes calculating the frequency-domain offset parameteric of the preamble in the random access channel according to an equation given as $$\bar{k} = \left[\frac{N_u + 1}{2} - \frac{1}{2}\frac{\Delta f}{\Delta f_{RA}}\right],$$

wherein $N_u$ represents a number of subcarriers in the random access channel that are used as a guard band, and a symbol [•] represents a rounding operation.

In an embodiment of the disclosure, the operation of determining the frequency-domain offset parameter $\bar{k}$ of the preamble in the random access channel further includes calculating the frequency-domain offset parameter $\bar{k}$ of the preamble in the random access channel according to an equation given as $$\bar{k} = \left[\frac{N_u}{2} - \frac{1}{2}\frac{\Delta f}{\Delta f_{RA}}\right],$$

Wherein $N_u$ represents a number of subcarriers in the random access channel that are used as a guard band, and a symbol [•] represents a rounding operation.

In an embodiment of the disclosure, the operation of determining the frequency-domain offset parameter $\bar{k}$ of the preamble in the random access channel further includes calculating the frequency-domain offset parameter $\bar{k}$ of the preamble in the random access channel according to an equation given as $\bar{k}=[N_u/2]$, wherein $N_u$ represents a number of subcarriers in the random access channel that are used as a guard band, and a symbol [•] represents a rounding operation.

In an embodiment of the disclosure, $$N_u = \frac{(N_{SC}N_{RB}^{RA}\Delta f - L_{RA}\Delta f_{RA})}{\Delta f}$$

wherein $N_{RB}^{RA}$ is a number of random access channel physical resource blocks $$N_{RB}^{RA} = \left\lceil\frac{L_{RA}\Delta f_{RA}}{\Delta f N_{SC}}\right\rceil$$

per UL channel subcarrier spacing $\Delta f$, a symbol $\lceil\cdot\rceil$ is a ceiling operation, and $N_{SC}$ is a number of subcarriers in one physical resource block.

In an embodiment of the disclosure, $N_u$ is obtained according to a correspondence table given as

| $L_{RA}$ | $\Delta f_{RA}$ | $\Delta f$ | NUMBER OF RANDOM ACCESS CHANNEL PHYSICAL RESOURCE BLOCKS (PER UL CHANNEL SUBCARRIER SPACING) | $N_u$ |
|---|---|---|---|---|
| 839 | 1.25 | 15 | 6 | 25 |
| 839 | 1.25 | 30 | 3 | 25 |
| 839 | 1.25 | 60 | 2 | 313 |
| 839 | 5 | 15 | 24 | 25 |
| 839 | 5 | 30 | 12 | 25 |
| 839 | 5 | 60 | 6 | 25 |
| 139 | 15 | 15 | 12 | 5 |
| 139 | 15 | 30 | 6 | 5 |
| 139 | 15 | 60 | 3 | 5 |
| 139 | 30 | 15 | 24 | 5 |
| 139 | 30 | 30 | 12 | 5 |
| 139 | 30 | 60 | 6 | 5 |
| 139 | 60 | 60 | 12 | 5 |
| 139 | 60 | 120 | 6 | 5 |
| 139 | 120 | 60 | 24 | 5 |
| 139 | 120 | 120 | 12 | 5 |

In an embodiment of the disclosure, the operation of determining the frequency-domain offset parameter $\bar{k}$ of the preamble in the random access channel further includes determining the frequency-domain offset parameter $\bar{k}$ of the preamble in the random access channel according to one of correspondence tables given as

| $L_{RA}$ | $\Delta f_{RA}$ | $\Delta f$ | NUMBER OF RANDOM ACCESS CHANNEL PHYSICAL RESOURCE BLOCKS (PER UL CHANNEL SUBCARRIER SPACING) | $\bar{k}$ |
|---|---|---|---|---|
| 839 | 1.25 | 15 | 6 | 7 |
| 839 | 1.25 | 30 | 3 | 1 |
| 839 | 1.25 | 60 | 2 | 133 |
| 839 | 5 | 15 | 24 | 12 |
| 839 | 5 | 30 | 12 | 10 |
| 839 | 5 | 60 | 6 | 7 |
| 139 | 15 | 15 | 12 | 3 |
| 139 | 15 | 30 | 6 | 2 |
| 139 | 15 | 60 | 3 | 1 |
| 139 | 30 | 15 | 24 | 3 |
| 139 | 30 | 30 | 12 | 3 |
| 139 | 30 | 60 | 6 | 2 |
| 139 | 60 | 60 | 12 | 3 |
| 139 | 60 | 120 | 6 | 2 |
| 139 | 120 | 60 | 24 | 3 |
| 139 | 120 | 120 | 12 | 3; |

| $L_{RA}$ | $\Delta f_{RA}$ | $\Delta f$ | NUMBER OF RANDOM ACCESS CHANNEL PHYSICAL RESOURCE BLOCKS (PER UL CHANNEL SUBCARRIER SPACING) | $\bar{k}$ |
|---|---|---|---|---|
| 839 | 1.25 | 15 | 6 | 7 |
| 839 | 1.25 | 30 | 3 | 1 |
| 839 | 1.25 | 60 | 2 | 133 |
| 839 | 5 | 15 | 24 | 11 |
| 839 | 5 | 30 | 12 | 10 |
| 839 | 5 | 60 | 6 | 7 |
| 139 | 15 | 15 | 12 | 2 |
| 139 | 15 | 30 | 6 | 2 |
| 139 | 15 | 60 | 3 | 1 |
| 139 | 30 | 15 | 24 | 2 |
| 139 | 30 | 30 | 12 | 2 |
| 139 | 30 | 60 | 6 | 2 |
| 139 | 60 | 60 | 12 | 2 |
| 139 | 60 | 120 | 6 | 2 |
| 139 | 120 | 60 | 24 | 2 |
| 139 | 120 | 120 | 12 | 2; | or

| $L_{RA}$ | $\Delta f_{RA}$ | $\Delta f$ | NUMBER OF RANDOM ACCESS CHANNEL PHYSICAL RESOURCE BLOCKS (PER UL CHANNEL SUBCARRIER SPACING) | $\bar{k}$ |
|---|---|---|---|---|
| 839 | 1.25 | 15 | 6 | 13 |
| 839 | 1.25 | 30 | 3 | 13 |
| 839 | 1.25 | 60 | 2 | 157 |
| 839 | 5 | 15 | 24 | 13 |
| 839 | 5 | 30 | 12 | 13 |
| 839 | 5 | 60 | 6 | 13 |
| 139 | 15 | 15 | 12 | 3 |
| 139 | 15 | 30 | 6 | 3 |
| 139 | 15 | 60 | 3 | 3 |
| 139 | 30 | 15 | 24 | 3 |
| 139 | 30 | 30 | 12 | 3 |
| 139 | 30 | 60 | 6 | 3 |
| 139 | 60 | 60 | 12 | 3 |
| 139 | 60 | 120 | 6 | 3 |
| 139 | 120 | 60 | 24 | 3 |
| 139 | 120 | 120 | 12 | 3. |

In accordance with another aspect of the disclosure, a random access method is provided. The random access method includes performing a switching of an uplink if an uplink switching condition is satisfied when a random access is performed based on a determined uplink and the random access fails and performing a random access based on the after-switching uplink.

In accordance with another aspect of the disclosure, a method for configuring random access information is provided. The method includes determining relevant configuration information for performing random access on at least two uplinks respectively, the configuration information comprises information for performing a switching between at least two uplinks, and transmitting the configuration information.

In accordance with another aspect of the disclosure, a terminal device is provided. The terminal device includes a switching device configured to perform a switching of an uplink if an uplink switching condition is met, when a random access is performed based on the determined uplink and the random access fails and an access device configured to perform a random access based on the after-switching uplink.

In accordance with another aspect of the disclosure, a base station is provided. The base station includes a determination device configured to determine relevant configuration information for performing random access on at least two uplinks, wherein the configuration information includes information for performing a switching between at least two uplinks and a transmission device configured to transmit the configuration information.

In accordance with another aspect of the disclosure, a terminal device is provided. The terminal device includes a processor and a memory configured to store machine-readable instructions that, when executed by the processor, cause the processor to perform the random access method described above.

In accordance with another aspect of the disclosure, a base station is provided. The base station includes a processor and a memory configured to store machine-readable instructions that, when executed by the processor, cause the processor to perform the above-described method for configuring random access information.

In accordance with another aspect of the disclosure, a computer-readable medium is provided. The computer-readable medium has stored thereon instructions which, when executed by a processor, cause the processor to perform the method as described above.

An embodiment of the disclosure provides a random access method. When a random access is performed based on the determined uplink and the random access fails, if the uplink switching condition is met, a switching is performed on the link, so that when the random access procedure attempt fails, whether the uplink switching condition is satisfied is determined in time, so as to determine whether a switching may be performed to the uplink with better channel condition so as to perform a random access. Moreover, the transmission is switched to the link when the uplink switching condition is met, which provides a precondition for a subsequent random access based on the after-switching link, and a random access is performed based on the after-switching uplink. When the random access attempt fails, the terminal may timely select the uplink with better channel quality to reattempt the random access procedure and perform a random access based on the after-switching uplink, thus reducing the delay of the random access and improving the overall performance of the system.

An embodiment of the disclosure provides a method for configuring random access information, which determines relevant configuration information used for performing random access on at least two uplinks respectively, wherein the configuration information includes information used for performing a switching between at least two uplinks, thus providing a premise guarantee for the terminal to perform random access on multiple uplinks and a switching between multiple uplinks. The configuration information is transmitted so that the terminal can perform a corresponding random access on multiple uplinks according to the configuration information when performing the random access.

In accordance with an aspect of the disclosure, a method by terminal is provided. The method includes receiving, from a base station, first information related to a length of a random access preamble and a first subcarrier spacing of a random access channel, receiving, from the base station, second information related to a second subcarrier spacing of a physical uplink shared channel (PUSCH), identifying an offset parameter based on the length of the random access preamble, the first subcarrier spacing, and the second subcarrier spacing, the offset parameter being used to identify a frequency resource of the random access channel, and transmitting the random access preamble based on the offset parameter.

In accordance with an aspect of the disclosure, a method by base station is provided. The method includes transmitting, to a terminal, first information related to a length of a random access preamble and a first subcarrier spacing of a random access channel, transmitting, to the terminal, second information related to a second subcarrier spacing of a physical uplink shared channel (PUSCH), and receiving the random access preamble based on an offset parameter which is identified based on the length of the random access preamble, the first subcarrier spacing, and the second subcarrier spacing, wherein the offset parameter is used to identify a frequency resource of the random access channel.

In accordance with an aspect of the disclosure, a terminal is provided. The terminal includes a transceiver; and at least one processor configured to receive, from a base station, first information related to a length of a random access preamble and a first subcarrier spacing of a random access channel, receive, from the base station, second information related to a second subcarrier spacing of a physical uplink shared channel (PUSCH), identify an offset parameter based on the length of the random access preamble, the first subcarrier spacing, and the second subcarrier spacing, the offset parameter being used to identify a frequency resource of the random access channel, and transmit the random access preamble based on the offset parameter.

In accordance with an aspect of the disclosure, a base station is provided. The base station includes a transceiver, and at least one processor configured to determine a resource of a random access channel, transmit, to a terminal, first information related to a length of a random access preamble and a first subcarrier spacing of a random access channel, transmit, to the terminal, second information related to a second subcarrier spacing of a physical uplink shared channel (PUSCH), and receive the random access preamble based on an offset parameter which is identified based on the length of the random access preamble, the first subcarrier spacing, and the second subcarrier spacing, wherein the offset parameter is used to identify a frequency resource of the random access channel.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
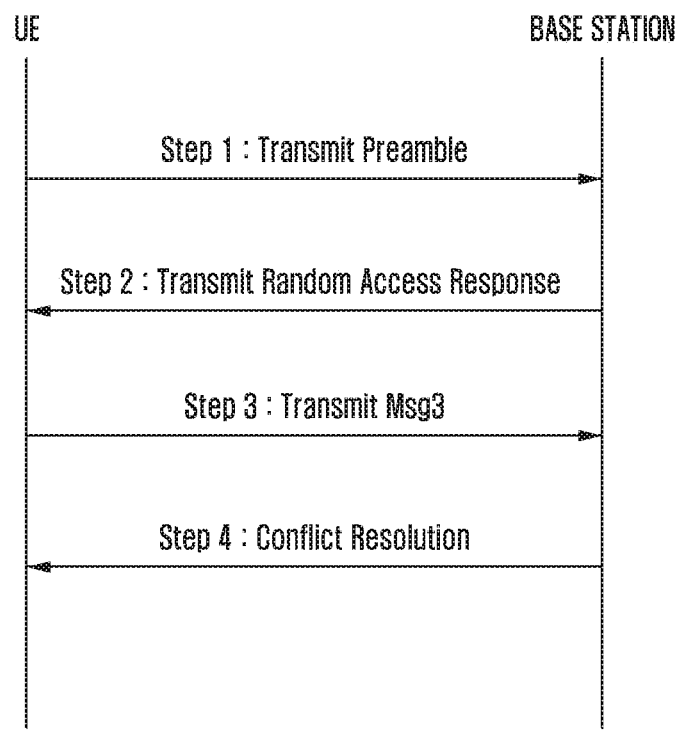
FIG. 1 illustrates a schematic diagram of a contention-based random access process according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be further understood that the word "comprising" used in the description of the disclosure refers to presence of features, integers, operations, elements, and/or components, but does not exclude presence or addition of one or more other features, integers, operations, elements, components, and/or combinations thereof. It should be understood that when an element is referred to as being "connected" or "coupled" to another element, it can be directly connected or coupled to the other element, or there may also be intermediate elements. In addition, "connected" or "coupled" as used herein may include wirelessly connected or wirelessly coupled. As used herein, the phrase "and/or" includes all or any of one or more of associated listed items, and all of combinations thereof.

It may be understood by the skilled in the art that, unless otherwise defined, all terms (including technical and scientific terms) used herein have the same meaning as commonly understood by the skilled in the art to which the disclosure belongs. It should also be understood that the terms, such as those defined in a general dictionary should be understood as having a meaning that is consistent with that in the context of the prior art, and will not be explained with an idealized or too formal meaning, unless specifically defined herein.

The skilled in the art may understand that the "user equipment (UE)", "terminal" and "terminal device" used herein include not only a wireless signal receiver device, which is a device only having a wireless signal receiver without a transmitting capability, but also a device with receiving and transmitting hardware, which is a device having receiving and transmitting hardware capable of performing a bidirectional communication over a bidirectional communication link. Such a device may include: a cellular or other communication device having a single line display or a multi-line display or a cellular or other communication device without a multi-line display; a personal communication service (PCS), which may combine voice, data processing, fax and/or data communication capabilities; a personal digital assistant (PDA), which may include a radio frequency (RF) receiver, a pager, Internet/Intranet access, a web browser, a notepad, a calendar, and/or a global positioning system (GPS) receiver; a laptop and/or palmtop computer or other device of the related art, which may be a laptop and/or palmtop computer or other device of the related art having and/or including an RF receiver. The "terminal", "terminal device" as used herein may be portable, transportable, installed in a vehicle (of aviation, maritime, and/or land), or may be adapted and/or configured to operate locally, and/or may operate in a distributed form on the earth and/or at any other locations in space. The "UE" and "terminal" used herein may also be a communication terminal, an Internet terminal, a music/video playing terminal, such as a PDA, a mobile Internet device (MID), and/or a mobile phone having a music/video playback function, or a smart television (TV), a set-top box and other devices. In addition, "UE" and "terminal" may also be replaced with "user" and "UE".

For the purpose of addressing the issue with the solution of the related art that the parameters for adjusting the frequency-domain position of the preamble cannot satisfy various possible combinations of the uplink (UL) shared channel subcarrier spacing and the random access channel subcarrier spacing in $5^{th}$ generation (5G), an embodiment of the disclosure provides a method performed at a UE for generating a baseband signal. The method includes reading random access configuration information from a base station, which includes random access channel configuration information and preamble configuration information, etc., obtaining a random access channel subcarrier spacing from the random access channel configuration information, and obtaining preamble length information from the preamble configuration information; and obtaining a UL channel subcarrier spacing from other system information, such as remaining minimum system information (RMSI), transmitted from the base station, determining a frequency-domain offset parameter of the preamble in a random access channel based on the obtained random access channel subcarrier spacing, UL channel subcarrier spacing, and preamble sequence length, and generating a baseband signal based on the determined frequency-domain offset parameter of the preamble in the random access channel.

Specifically, the baseband signal is generated according to Equation 1:

$$s_l^{(p,\mu)}(t) = \sum_{k=0}^{L_{RA}-1} a_k^{(p,PA)} \cdot e^{j2\pi(k+Kk_0+\bar{K})\Delta f_{RA}(t-N_{CP,l}^{RA}T_c)}$$

$$K = \Delta f / \Delta f_{RA}$$

Equation 1 where a parameter $L_{RA}$ is a preamble length, $k_0$ is a parameter for adjusting a position of a random access channel, $\Delta f$ is a UL data channel subcarrier spacing or a UL channel subcarrier spacing for initial access, $\Delta f_{RA}$ is a random access channel subcarrier spacing, $N_{CP,l}^{RA}$ is a cyclic prefix length of a preamble, $T_c$ is a sampling interval, and $\bar{K}$ is a parameter for adjusting a position of a preamble in a random access channel, i.e., a frequency-domain offset parameter of a preamble in a random access channel as used herein.

Thus, the disclosure focuses on determination of the frequency-domain offset parameter $\bar{K}$ of the preamble in the random access channel.

Hereinafter, a flowchart of a method performed at a UE for determining a frequency-domain offset parameter of a preamble in a random access channel according to an embodiment of the disclosure will be described with reference to FIG. 2.

Figure 2:
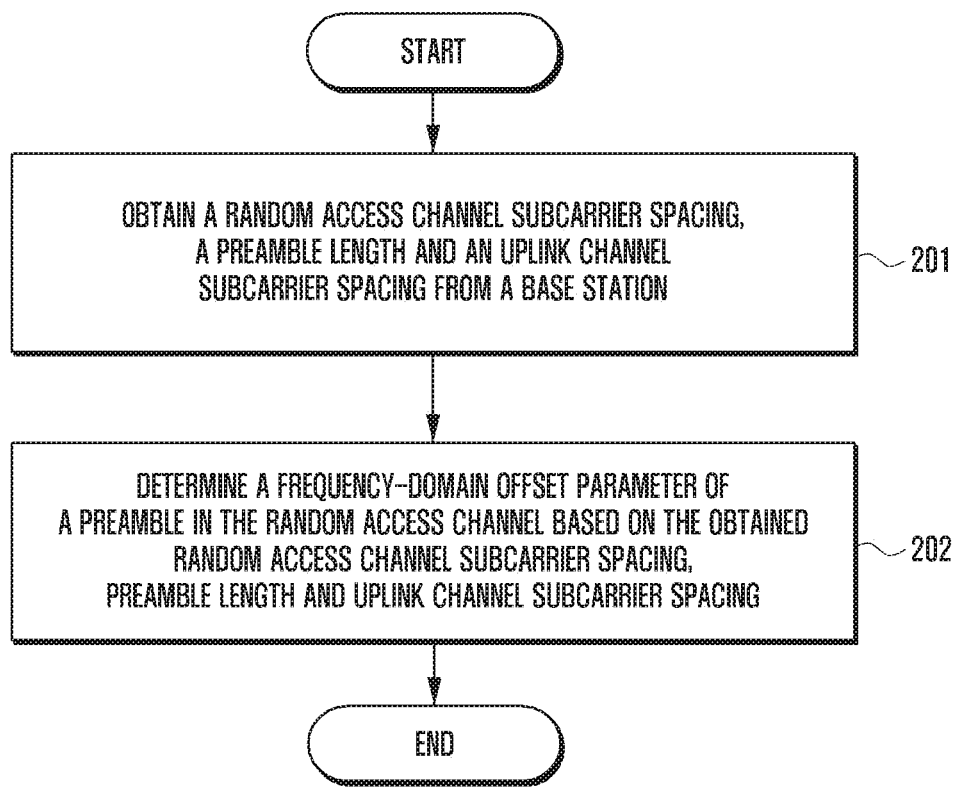
FIG. 2 illustrates a flowchart of a method performed at a user equipment (UE) for determining a frequency-domain offset parameter of a preamble in a random access channel according to an embodiment of the disclosure.

FIG. 2 illustrates a flowchart of a method performed at a UE for determining a frequency-domain offset parameter of a preamble in a random access channel according to an embodiment of the disclosure.

Referring to FIG. 2, the method may include operations 201 and 202.

In operation 201, the UE may obtain a random access channel subcarrier spacing $\Delta f_{RA}$, a preamble length $L_{RA}$ and a UL channel subcarrier spacing $\Delta f$ from a base station.

In operation 202, the UE may determine a frequency-domain offset parameter $\bar{K}$ of a preamble in a random access channel based on the obtained random access channel subcarrier spacing $\Delta f_{RA}$, preamble length $L_{RA}$ and UL channel subcarrier spacing $\Delta f$.

The frequency domain offset parameter $\bar{K}$ of the preamble in the random access channel may be obtained by calculation or by looking up a predefined correspondence table between a frequency-domain offset parameter $\bar{K}$ of a preamble in a random access channel and a random access channel subcarrier spacing $\Delta f_{RA}$, a preamble length $L_{RA}$, a UL channel subcarrier spacing $\Delta f$.

Here, "UL channel" refers to a UL data channel, such as a physical UL shared channel (PUSCH), unless stated otherwise.

In an embodiment of obtaining the frequency-domain offset parameter $\bar{k}$ of the preamble in the random access channel by calculation, the frequency-domain offset parameter $\bar{k}$ of the preamble in the random access channel may be calculated according to the random access channel subcarrier spacing $\Delta f_{RA}$, the preamble length $L_{RA}$ and the UL channel subcarrier spacing $\Delta f$ obtained from the base station. The embodiment of the disclosure provides several implementations as follows.

First Implementation

In this implementation, when a value of the frequency-domain offset parameter $\bar{k}$ of the preamble in the random access channel is to be calculated, it is necessary to ensure that guard bandwidths between two ends of the preamble and their closest subcarriers for data transmission are consistent.

Figure 3:
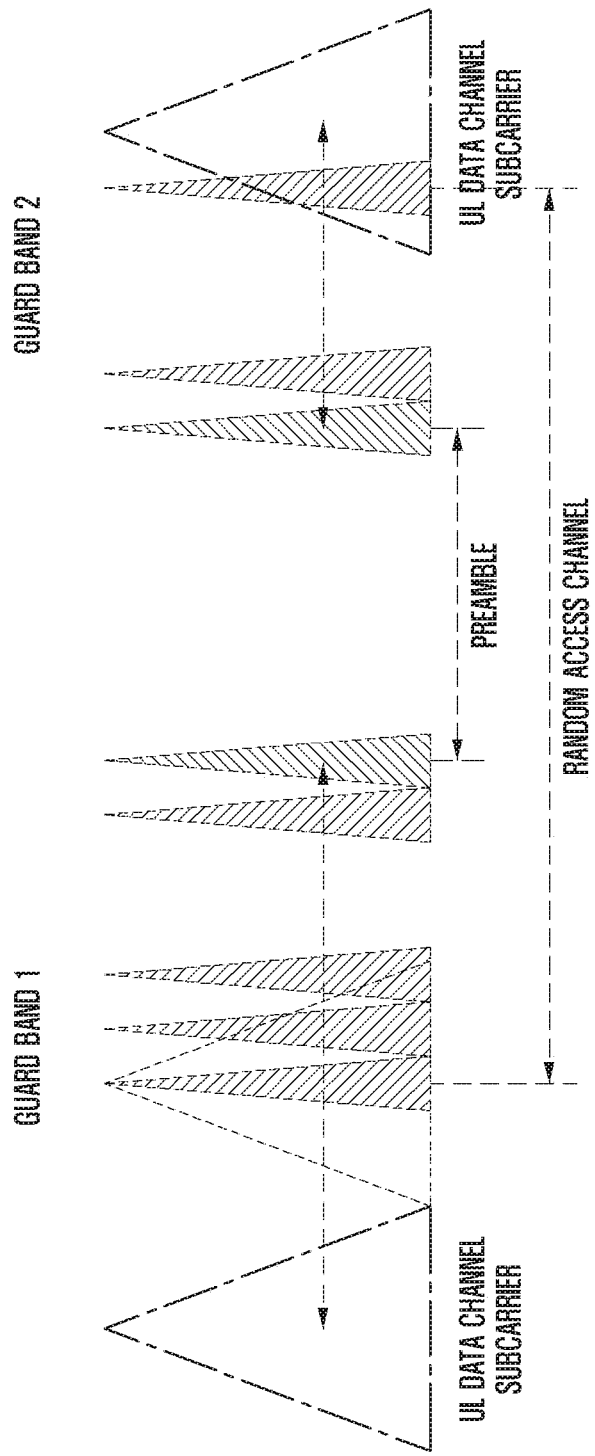
FIG. 3 illustrates a schematic diagram of a random access channel guard band according to an embodiment of the disclosure.

FIG. 3 illustrates a schematic diagram of a random access channel guard band according to an embodiment of the disclosure.

Referring to FIG. 3, a first subcarrier of the random access channel is overlapped with a subcarrier of the UL channel by setting a parameter $Kk_0$. Thus, a spacing between the first subcarrier of the random access channel and a last subcarrier of its adjacent UL channel is one UL channel subcarrier spacing.

It can be seen that when the guard band between the first subcarrier of the preamble and its adjacent UL channel is to be calculated, it is required to add a subcarrier bandwidth of the UL channel, in addition to the guard band within the access random channel; while when the guard band between the last subcarrier of the preamble and its adjacent UL channel is to be calculated, it is required to add one more subcarrier spacing of the access random channel.

Specifically, assuming that the number, denoted as $N_u$, of sub-carriers used as a guard band within the random access channel may be obtained by calculating the UL channel subcarrier spacing, the random access channel subcarrier spacing $\Delta f_{RA}$, and the preamble length $L_{RA}$. Thus, when the bandwidths between the two ends of the preamble and their closest subcarriers of the UL channel are to be calculated, a bandwidth $BW_g$ is $(N_u+1)\Delta f_{RA}+\Delta f$, where $N_u+1$ takes into account the subcarriers within the random access channel that are used as the guard band, and the subcarrier spacing between the last subcarrier of the random access channel and its adjacent UL channel, which is the subcarrier spacing of the random access channel; $\Delta f$ is the UL channel subcarrier spacing, which is used for calculating the bandwidth of the guard band when calculating the distance between the first subcarrier of the preamble and its adjacent UL subcarrier. $\bar{k}$ represents the number of the random access channel subcarriers within the guard band between the first subcarrier of the first preamble and the last subcarrier of its adjacent UL channel. The parameter $\bar{k}$ may be calculated as follows.

First, a bandwidth of the random access preamble between the subcarriers of the UL channel at two ends of the random access preamble is calculated as follows:

$$BW_g=(N_u+1)\Delta f_{RA}+\Delta f$$

Then, a bandwidth of the guard band on one side may be obtained as follows:

$$BW_h=BW_g/2$$

According to the subcarrier width of the UL channel, the number of the subcarriers within the random access channel on the side as described previously may be obtained as follows:

$$\bar{k}=[(BW_h-\Delta f)/\Delta f_{RA}]$$

wherein the symbol [•] represents a rounding operation, and may be replaced with a ceil symbol or a floor symbol.

As such, the parameter $\bar{k}$ may be calculated according to an equation as follows:

$$\bar{k} = \left[\left(\frac{(N_u+1)\Delta f_{RA}+\Delta f}{2}-\Delta f\right)\bigg/\Delta f_{RA}\right] \qquad \text{Equation 2}$$
$$= \left[\frac{N_u+1}{2}-\frac{1}{2}\frac{\Delta f}{\Delta f_{RA}}\right]$$

where the symbol [•] represents a rounding operation, and may be replaced with a ceil symbol or a floor symbol.

Second Implementation

In this implementation, when a subcarrier spacing within the random access channel is to be calculated, a spacing between the last subcarrier within the random access channel and its adjacent UL channel is not calculated. That is, when a guard band between the last subcarrier of the preamble and its adjacent UL channel subcarrier is to be calculated, only the number of subcarriers within the random access channel is calculated. In this case, the parameter $\bar{k}$ is calculated as follows.

First, a bandwidth of the random access preamble between the subcarriers of the UL channel at two ends of the random access preamble is calculated as follows:

$$BW_g=N_u\Delta f_{RA}+\Delta f$$

Then, a bandwidth of the guard band on one side may be obtained as follows:

$$BW_h=BW_g/2$$

According to the subcarrier width of the UL channel, the number of the subcarriers within the random access channel at the side as described previously may be obtained as follows:

$$\bar{k}=[(BW_h-\Delta f)/\Delta f_{RA}]$$

where the symbol [•] represents a rounding operation, and may be replaced with a ceil symbol or a floor symbol.

As such, the parameter $\bar{k}$ may be calculated by an equation as follows:

$$\bar{k} = \left[\left(\frac{N_u\Delta f_{RA}+\Delta f}{2}-\Delta f\right)\bigg/\Delta f_{RA}\right] \qquad \text{Equation 3}$$
$$= \left[\frac{N_u}{2}-\frac{1}{2}\frac{\Delta f}{\Delta f_{RA}}\right]$$

where the symbol [•] represents a rounding operation, and may be replaced with a ceil symbol or a floor symbol.

Third Implementation

Figure 4:
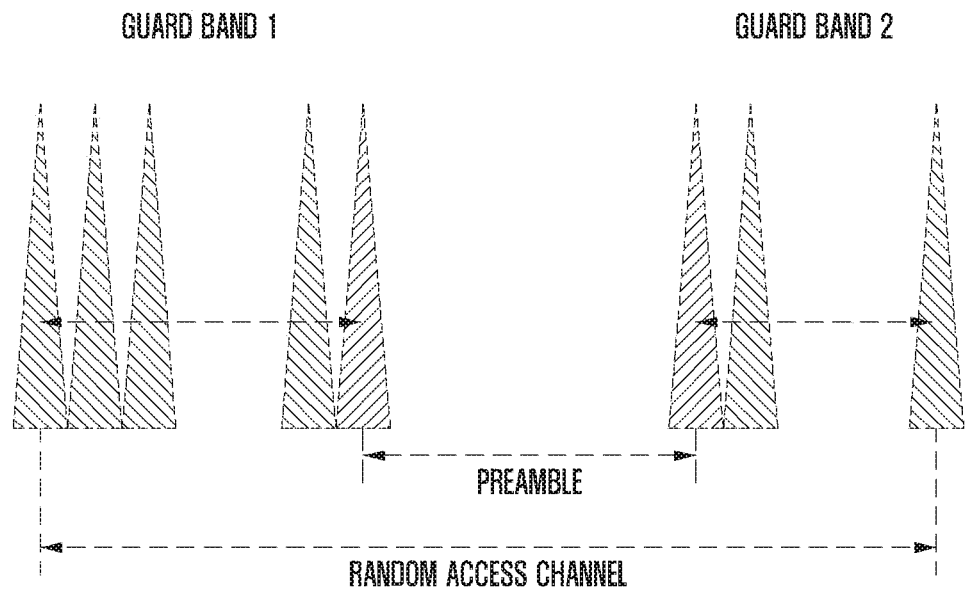
FIG. 4 illustrates schematic diagram of a random access channel guard band according to an embodiment of the disclosure.

FIG. 4 illustrates schematic diagram of a random access channel guard band according to an embodiment of the disclosure.

Referring to FIG. 4, in this implementation, only the number of the subcarriers within the random access channel is considered, so that the numbers of the subcarriers on two sides of the random access preamble are approximately equal.

In this case, the number $\bar{k}$ of the subcarriers for the guard band before the first subcarrier of the preamble may be calculated as follows:

$$\bar{k}=[N_u/2] \qquad \text{Equation 4}$$

where the symbol [•] represents a rounding operation, and may be replaced with a ceil symbol or a floor symbol.

Although the disclosure provides only the above three implementations as various embodiments of calculating the frequency-domain offset parameter $\bar{k}$ of the preamble in the random access channel, the disclosure is not limited thereto. Any other suitable methods of calculating the frequency-domain offset parameter $\bar{k}$ of the preamble in the random access channel based on the random access channel subcarrier spacing $\Delta f_{RA}$, the preamble length $L_{RA}$ and the UL channel subcarrier spacing $\Delta f$ also fall within the scope of the disclosure.

In the above calculation process, $N_u$ is the number of subcarriers in the random access channel for the guard band, which may be obtained by looking up a predefined correspondence table (Table 2 as shown below) between $N_u$ and the random access channel subcarrier spacing $\Delta f_{RA}$, the preamble length $L_{RA}$, the UL channel subcarrier spacing $\Delta f$, or may be calculated based on the random access channel subcarrier spacing $\Delta f_{RA}$, the preamble length $L_{RA}$, and the UL channel subcarrier spacing $\Delta f$.

TABLE 2

Number of Subcarriers for Guard Band

| $L_{RA}$ | $\Delta f_{RA}$ | $\Delta f$ | NUMBER OF RANDOM ACCESS CHANNEL PHYSICAL RESOURCE BLOCKS (PER UL CHANNEL SUBCARRIER SPACING) | $N_u$ |
|---|---|---|---|---|
| 839 | 1.25 | 15 | 6 | 25 |
| 839 | 1.25 | 30 | 3 | 25 |
| 839 | 1.25 | 60 | 2 | 313 |
| 839 | 5 | 15 | 24 | 25 |
| 839 | 5 | 30 | 12 | 25 |
| 839 | 5 | 60 | 6 | 25 |
| 139 | 15 | 15 | 12 | 5 |
| 139 | 15 | 30 | 6 | 5 |
| 139 | 15 | 60 | 3 | 5 |
| 139 | 30 | 15 | 24 | 5 |
| 139 | 30 | 30 | 12 | 5 |
| 139 | 30 | 60 | 6 | 5 |
| 139 | 60 | 60 | 12 | 5 |
| 139 | 60 | 120 | 6 | 5 |
| 139 | 120 | 60 | 24 | 5 |
| 139 | 120 | 120 | 12 | 5 |

In the embodiment of obtaining $N_u$ by calculation, the number of random access channel physical resource blocks per each UL channel subcarrier spacing is firstly calculated as follows:

$$N_{RB}^{RA} = \left\lceil \frac{L_{RA}\Delta f_{RA}}{\Delta f N_{SC}} \right\rceil$$

where $N_{SC}$ is a number of subcarriers in one physical resource block, and a value of $N_{SC}$ may be fixed to be 12; $N_{RB}^{RA}$ is a number of random access channel physical resource blocks per UL channel subcarrier spacing, and a symbol $\lceil \cdot \rceil$ is a ceiling operation.

The number of sub-carriers within the random access channel which are used as the guard band is then calculated as follows:

$$N_u = (N_{SC}N_{RB}^{RA}\Delta f - L_{RA}\Delta f_{RA})/\Delta f$$

In the embodiment of obtaining the frequency-domain offset parameter $\bar{k}$ of the preamble in the random access channel by looking up the predefined correspondence table between the frequency-domain offset parameter $\bar{k}$ of the preamble in the random access channel and the random access channel subcarrier spacing $\Delta f_{RA}$, the preamble length $L_{RA}$, the UL channel subcarrier spacing $\Delta f$, the disclosure provides several possible correspondence tables as follows.

A possible correspondence table is shown in Table 3.

TABLE 3

Possible Values of Parameter $\bar{k}$

| $L_{RA}$ | $\Delta f_{RA}$ | $\Delta f$ | NUMBER OF RANDOM ACCESS CHANNEL PHYSICAL RESOURCE BLOCKS (PER UL CHANNEL SUBCARRIER SPACING) | $\bar{k}$ |
|---|---|---|---|---|
| 839 | 1.25 | 15 | 6 | 7 |
| 839 | 1.25 | 30 | 3 | 1 |
| 839 | 1.25 | 60 | 2 | 133 |
| 839 | 5 | 15 | 24 | 12 |
| 839 | 5 | 30 | 12 | 10 |
| 839 | 5 | 60 | 6 | 7 |
| 139 | 15 | 15 | 12 | 3 |
| 139 | 15 | 30 | 6 | 2 |
| 139 | 15 | 60 | 3 | 1 |
| 139 | 30 | 15 | 24 | 3 |
| 139 | 30 | 30 | 12 | 3 |
| 139 | 30 | 60 | 6 | 2 |
| 139 | 60 | 60 | 12 | 3 |
| 139 | 60 | 120 | 6 | 2 |
| 139 | 120 | 60 | 24 | 3 |
| 139 | 120 | 120 | 12 | 3 |

Another possible correspondence table is shown in Table 4.

TABLE 4

Other Possible Values of Parameter $\bar{k}$

| $L_{RA}$ | $\Delta f_{RA}$ | $\Delta f$ | NUMBER OF RANDOM ACCESS CHANNEL PHYSICAL RESOURCE BLOCKS (PER UL CHANNEL SUBCARRIER SPACING) | $\bar{k}$ |
|---|---|---|---|---|
| 839 | 1.25 | 15 | 6 | 7 |
| 839 | 1.25 | 30 | 3 | 1 |
| 839 | 1.25 | 60 | 2 | 133 |
| 839 | 5 | 15 | 24 | 11 |
| 839 | 5 | 30 | 12 | 10 |
| 839 | 5 | 60 | 6 | 7 |
| 139 | 15 | 15 | 12 | 2 |
| 139 | 15 | 30 | 6 | 2 |
| 139 | 15 | 60 | 3 | 1 |
| 139 | 30 | 15 | 24 | 2 |
| 139 | 30 | 30 | 12 | 2 |
| 139 | 30 | 60 | 6 | 2 |
| 139 | 60 | 60 | 12 | 2 |
| 139 | 60 | 120 | 6 | 2 |
| 139 | 120 | 60 | 24 | 2 |
| 139 | 120 | 120 | 12 | 2 |

Yet another possible correspondence table is shown in Table 5.

TABLE 5

Yet Other Possible Values of Parameter $\bar{k}$

| $L_{RA}$ | $\Delta f_{RA}$ | $\Delta f$ | NUMBER OF RANDOM ACCESS CHANNEL PHYSICAL RESOURCE BLOCKS (PER UL CHANNEL SUBCARRIER SPACING) | $\bar{k}$ |
|---|---|---|---|---|
| 839 | 1.25 | 15 | 6 | 13 |
| 839 | 1.25 | 30 | 3 | 13 |
| 839 | 1.25 | 60 | 2 | 157 |
| 839 | 5 | 15 | 24 | 13 |
| 839 | 5 | 30 | 12 | 13 |
| 839 | 5 | 60 | 6 | 13 |
| 139 | 15 | 15 | 12 | 3 |
| 139 | 15 | 30 | 6 | 3 |
| 139 | 15 | 60 | 3 | 3 |
| 139 | 30 | 15 | 24 | 3 |
| 139 | 30 | 30 | 12 | 3 |
| 139 | 30 | 60 | 6 | 3 |
| 139 | 60 | 60 | 12 | 3 |
| 139 | 60 | 120 | 6 | 3 |
| 139 | 120 | 60 | 24 | 3 |
| 139 | 120 | 120 | 12 | 3 |

In the examples as shown in the above Tables 3, 4 and 5, the predefined correspondence tables are known by both the UE and the base station. Respective parameters $\bar{k}$ may be obtained from the corresponding correspondence tables based on the random access channel subcarrier spacing $\Delta f_{RA}$, the preamble length $L_{RA}$, the UL channel subcarrier spacing $\Delta f$ obtained from the base station.

Alternatively, Table 5 may be simplified according to the preamble format or the preamble length. In particular:

$\bar{k}$ is 3, if the preamble length $L_{RA}$ is 139;

$\bar{k}$ is 13, if the preamble length $L_{RA}$ is 839 and the UL channel subcarrier spacing $\Delta f$ is not 60 kHz; and $\bar{k}$ is 157, if the preamble length $L_{RA}$ is 839 and the UL channel subcarrier spacing $\Delta f$ is 60 kHz.

In addition, since both the random access channel subcarrier spacing and the preamble length are directly determined by the preamble format, the frequency-domain position offset $\bar{k}$ may be determined according to the preamble format and the UL channel subcarrier spacing $\Delta f$.

Again, Table 5 is taken as an example:

for the preamble format 0, 1 or 2, if the UL channel subcarrier spacing $\Delta f$ is not 60 kHz, the frequency-domain offset $\bar{k}$ is 13; and if the UL channel subcarrier spacing $\Delta f$ is 60 kHz, the frequency-domain offset $\bar{k}$ is 157;

for the preamble format 3, the frequency offset is 13; and for the preamble format A0, A1, A2, A3, B1, B2, B3, C0, C2 or A1/B1, the frequency-domain offset $\bar{k}$ is 3. The above description may also be determined by looking up the tables.

For other correspondence tables (e.g., Tables 3 and 4), optimization of the correspondence tables may also be performed in a similar way. For example, the first two columns of indexes in Tables 3, 4 and 5 may be merged as the preamble format. For example, possible correspondence tables are shown in Tables 6, 7 and 8.

TABLE 6

A Possible Way of Determining Parameter $\bar{k}$

| Preamble Format | $\Delta f$ | NUMBER OF RANDOM ACCESS CHANNEL PHYSICAL RESOURCE BLOCKS (PER UL CHANNEL SUBCARRIER SPACING) | $\bar{k}$ |
|---|---|---|---|
| 0, 1, 2 | 15 | 6 | 7 |
|  | 30 | 3 | 1 |
|  | 60 | 2 | 133 |

TABLE 6-continued

A Possible Way of Determining Parameter $\bar{k}$

| Preamble Format | $\Delta f$ | NUMBER OF RANDOM ACCESS CHANNEL PHYSICAL RESOURCE BLOCKS (PER UL CHANNEL SUBCARRIER SPACING) | $\bar{k}$ |
|---|---|---|---|
| 3 | 15 | 24 | 12 |
|  | 30 | 12 | 10 |
|  | 60 | 6 | 7 |
| A0, A1, A2, A3, B1, B2, B3, C0, C2, A1/B1 | 15 | 12 | 3 |
|  | 30 | 6 | 2 |
|  | 60 | 3 | 1 |
|  | 15 | 24 | 3 |
|  | 30 | 12 | 3 |
|  | 60 | 6 | 2 |
|  | 60 | 12 | 3 |
|  | 120 | 6 | 2 |
|  | 60 | 24 | 3 |
|  | 120 | 12 | 3 |

TABLE 7

Another Possible Way of Determining Parameter $\bar{k}$

| Preamble Format | $\Delta f$ | NUMBER OF RANDOM ACCESS CHANNEL PHYSICAL RESOURCE BLOCKS (PER UL CHANNEL SUB CARRIER SPACING) | $\bar{k}$ |
|---|---|---|---|
| 0, 1, 2 | 15 | 6 | 7 |
|  | 30 | 3 | 1 |
|  | 60 | 2 | 133 |
| 3 | 15 | 24 | 11 |
|  | 30 | 12 | 10 |
|  | 60 | 6 | 7 |
| A0, A1, A2, A3, B1, B2, B3, C0, C2, A1/B1 | 15 | 12 | 2 |
|  | 30 | 6 | 2 |
|  | 60 | 3 | 1 |
|  | 15 | 24 | 2 |
|  | 30 | 12 | 2 |
|  | 60 | 6 | 2 |
|  | 60 | 12 | 2 |
|  | 120 | 6 | 2 |
|  | 60 | 24 | 2 |
|  | 120 | 12 | 2 |

TABLE 8

Yet Another Possible Way of Determining Parameter $\bar{k}$

| Preamble Format | $\Delta f$ | NUMBER OF RANDOM ACCESS CHANNEL PHYSICAL RESOURCE BLOCKS (PER UL CHANNEL SUBCARRIER SPACING) | $\bar{k}$ |
|---|---|---|---|
| 0, 1, 2 | 15 | 6 | 13 |
|  | 30 | 3 | 13 |
|  | 60 | 2 | 157 |
| 3 | 15 | 24 | 13 |
|  | 30 | 12 | 13 |
|  | 60 | 6 | 13 |
| A0, A1, A2, A3, B1, B2, B3, C0, C2, A1/B1 | 15 | 12 | 3 |
|  | 30 | 6 | 3 |
|  | 60 | 3 | 3 |
|  | 15 | 24 | 3 |
|  | 30 | 12 | 3 |
|  | 60 | 6 | 3 |
|  | 60 | 12 | 3 |
|  | 120 | 6 | 3 |
|  | 60 | 24 | 3 |
|  | 120 | 12 | 3 |

Hereinafter, a structure of a UE according to an embodiment of the disclosure will be described with reference to FIG. 5.

Figure 5:
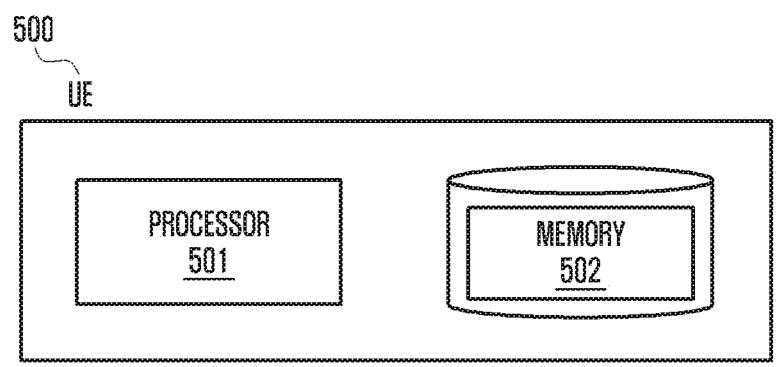
FIG. 5 illustrates a structural schematic diagram of a UE according to an embodiment of the disclosure.

FIG. 5 illustrates a structural block diagram of a UE according to an embodiment of the disclosure.

Referring to FIG. 5, a UE 500 may be used to perform the method 200 as described with reference to FIG. 2. For the sake of brevity, only the schematic structure of the UE according to the embodiment of the disclosure will be described herein, and details that have already been described in the method 200 as previously described with reference to FIG. 2 will thus be omitted.

Referring to FIG. 5, the UE 500 includes a processing unit or processor 501. The processor 501 may be a single unit or a combination of multiple units for performing different operations of the method. The memory 502 stores computer-executable instructions, which, when executed by the processor 501, cause the processor 501 to: obtain a random access channel subcarrier spacing $\Delta f_{RA}$, a preamble length $L_{RA}$ and a UL channel subcarrier spacing $\Delta f$ from a base station; and determine a frequency-domain offset parameter $\bar{k}$ of a preamble in a random access channel based on the obtained random access channel subcarrier spacing $f\Delta_{RA}$, preamble length $L_{RA}$ and UL channel subcarrier spacing $\Delta f$.

As described above, the frequency domain offset parameter $\bar{k}$ of the preamble in the random access channel may be calculated by the above three implementations as described previously, or may be obtained by looking up a predefined correspondence table (e.g., one of the above Tables 3-8) between the frequency-domain offset parameter $\bar{k}$ of the preamble in the random access channel and the random access channel subcarrier spacing $\Delta f_{RA}$, the preamble length $L_{RA}$, the UL channel subcarrier spacing $\Delta f$. Reference may be made to the relevant description of the method 200 as shown in FIG. 2.

Hereinafter, a method of generating a random access preamble baseband signal will be described. As described in the foregoing embodiments of the disclosure, the random access baseband signal is generated using an equation as follows.

$$s_l^{(p,\mu)}(t) = \sum_{k=0}^{L_{RA}-1} a_k^{(p,PA)} \cdot e^{j2\pi(k+Kk_0+\bar{k})\Delta f_{RA}(t-N_{CP,l}^{RA}T_c)}$$

$$K = \Delta f / \Delta f_{RA}$$

where $a_k^{(p,RA)}$ is a frequency-domain sequence generated for the preamble, and is generated using an equation as follows.

$$a_k^{(p,RA)} = \beta_{PRACH} y_{u,v}(k)$$

$$k=0,1,\ldots,L_{RA}-1$$

where $\beta_{PRACH}$ is an amplitude adjustment factor obtained for power control, which is used for allowing the transmitted signal to satisfy a power control constraint. $y_{u,v}(k)$ is a frequency-domain signal obtained by transforming the preamble into the frequency domain, and is obtained by an equation as follows.

$$y_{u,v}(n) = \sum_{m=0}^{L_{RA}-1} x_{u,v}(m) \cdot e^{-j\frac{2\pi mn}{L_{RA}}},$$

where $x_{u,v}(m)$ is a time-domain preamble.

As seen from the above description, following operations are required in order to generate a baseband signal: discrete fourier transform (DFT) for generating a frequency-domain sequence $y_{u,v}(n)$ from a time-domain preamble $x_{u,v}(m)$; subcarrier mapping for selecting a frequency-domain position of the preamble based on a frequency-domain position of the random access channel and a position of the preamble in the random access channel; inverse discrete fourier transform (IDFT) for generating a final time-domain baseband signal. The above operations may be shown in FIG. 6.

Figure 6:
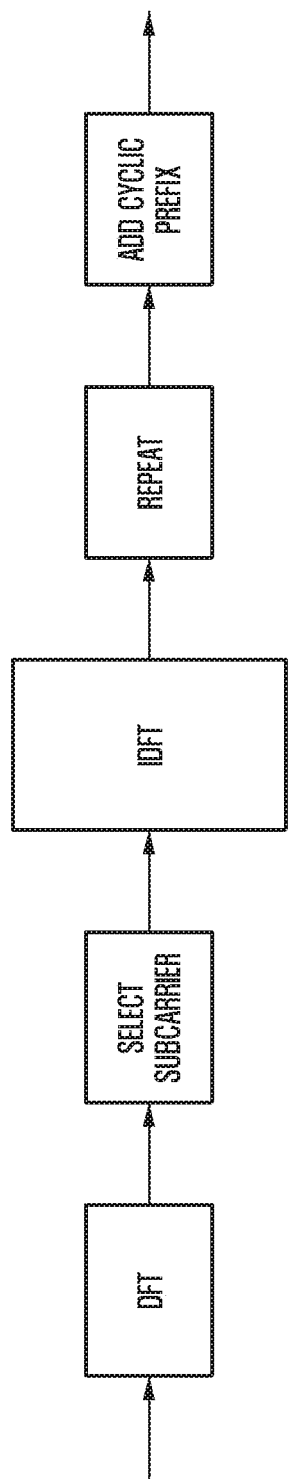
FIG. 6 illustrates a discrete fourier transform (DFT)-based baseband signal generation method according to an embodiment of the disclosure.

FIG. 6 illustrates a discrete fourier transform (DFT)-based baseband signal generation method according to an embodiment of the disclosure.

Referring to FIG. 6, for some preamble formats, it needs to be repeated in the time domain. A repeat module in FIG. 6 is used to generate repeated preamble symbols.

Considering that in actual implementations, DFT and IDFT are generally implemented by fast fourier transform (FFT) and inverse fast fourier transform (IFFT), and the number of FFT points is a power of 2, there will be some problems in implementation if the above generation method is used, since the random access channel subcarrier spacing does not match the UL data channel subcarrier spacing.

Specifically, for a case in which the UL channel subcarrier spacing is greater than the random access subcarrier spacing, the IFFT used when the frequency-domain signal is transformed into the time-domain signal will require a larger number of IFFT points. A simple example is a case in which the random access channel subcarrier spacing is 1.25 kHz and the UL channel subcarrier spacing is 15 kHz. In order to meet the sampling interval specified in the protocol, 49152-point IFFT is needed, and 24576-point IFFT is needed even for the sampling interval in long term evolution (LTE).

For a case in which the UL channel subcarrier spacing is smaller than the random access subcarrier spacing, using the UL channel subcarrier spacing directly may cause some waste.

One possible improved method includes: using the number of points of IFFT determined according to the random access preamble length, determining the sampling interval of the time-domain samples according to the number of points of IFFT and the random access channel subcarrier spacing, and adjusting a sampling rate after a cyclic prefix is added.

Figure 7:
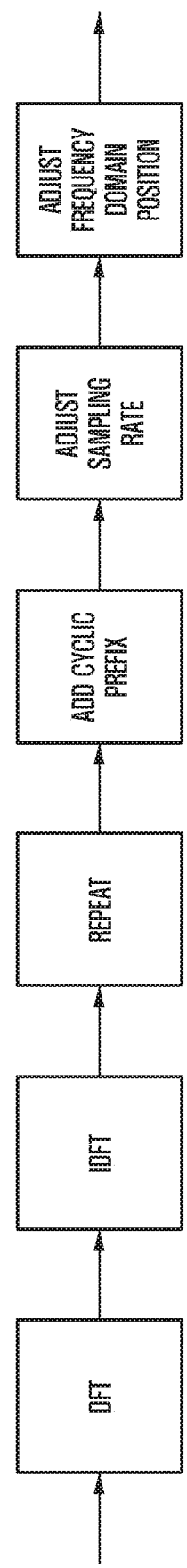
FIG. 7 illustrates an improved preamble baseband signal generation method according to an embodiment of the disclosure.

The flowchart of the improved method is shown in FIG. 7.

FIG. 7 illustrates an improved preamble baseband signal generation method according to an embodiment of the disclosure.

Referring to FIG. 7, the number of points of IDFT is selected according to the preamble length. For example, for a preamble with a length of 839, an IDFT of 1024 points is selected; and for a preamble with a length of 139, an IDFT of 512 points is selected.

The sampling interval in the time domain is selected based on the number of points of IDFT and the frequency of the subcarrier of the random access channel Particular selections are shown in Table 9 below.

TABLE 9

Selection of Time-Domain Sampling Frequency

| Preamble Length | Random Access Channel Subcarrier Spacing (kHz) | Number of IDFT Points | Time-Domain Sampling Frequency $f_{RA}$ (MHz) |
|---|---|---|---|
| 839 | 1.25 | 1024 | 1.28 |
| 839 | 5 | 1024 | 5.12 |
| 139 | 15 | 512 | 7.68 |
| 139 | 30 | 512 | 15.36 |
| 139 | 60 | 512 | 30.72 |
| 139 | 120 | 512 | 61.44 |

A length of the cyclic prefix added subsequently should also be adjusted according to the above relationship between the required sampling frequency and the final sampling frequency. The sampling frequency of the time-domain signal generated after IDFT is $f_{RA}$, and the sampling interval is $T_{RA}=f_{RA}$, then the length of the added cyclic prefix is $T_{CP}=N_{CP}^{RA}T_{RA}$, where $N_{CP}^{RA}$ is the number of cyclic prefix points calculated according to the number of points of IDFT, which may be determined in advance according to the preamble format.

Considering that for all possible time-domain sampling intervals, no maximum sampling frequency specified in 5G is exceeded, the subsequent sampling interval adjustments may upsample the time-domain signal subjected to IDFT, possible time-domain repetition and addition of the cyclic prefix to generate a time-domain signal that meets the 5G system requirements.

Since there is no frequency-domain position selection in the foregoing process (in the flowchart as shown in FIG. 6, subcarrier selection is used), it is necessary to perform frequency-domain position adjustment on the generated time-domain signal. Considering that the frequency-domain position adjustment reflected in the time domain is a phase adjustment, the module performs phase adjustment on the generated time-domain signal.

In a specific example, if the first subcarrier of the preamble needs to have a position offset of $\phi_k$ in the frequency domain, the signal at a time point t needs a phase adjustment amount of $e^{j2\pi\phi_k\Delta f t}$. If the effect of CP is considered, the phase adjustment amount should be $e^{j2\pi\phi_k\Delta f(t-N_{CP}^{RA}T_c)}$, where $T_c$ is a system sampling rate. It should be noted that the frequency offset position in this example is measured by the UL channel subcarrier spacing $\Delta f$. If frequency offset position in this example is measured by the random access channel subcarrier spacing, the equation needs to be modified, and the phase adjustment amount at the time point t is $e^{j2\pi K\phi_k\Delta f_{RA}t}$. If the effect of CP is considered, the phase adjustment amount is $e^{j2\pi\phi_k\Delta f(t-N_{CP}^{RA}T_c)}$, where $K=\Delta f/\Delta f_{RA}$.

In the foregoing example, the preamble is defined in the time domain, so it is required to firstly perform DFT to transform it into a frequency-domain signal. Another simple way is to use a frequency-domain sequence with a length $L_{RA}$ directly, i.e., using a sequence $y_{u,v}(k)$ or a sequence $a_k^{(p,RA)}$ directly. In this case, a flowchart of generating a preamble baseband signal is shown in FIG. 8.

Figure 8:
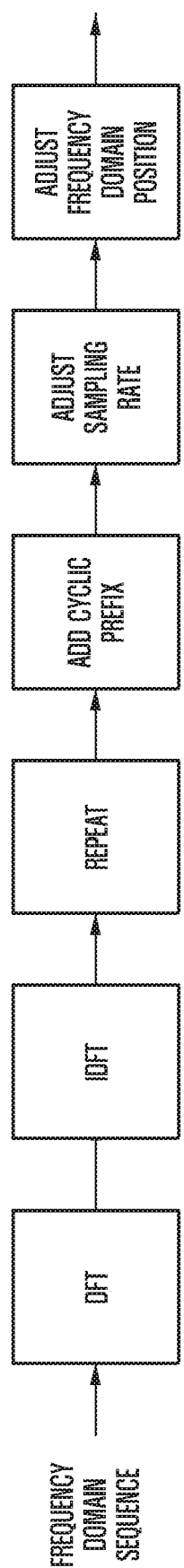
FIG. 8 illustrates method of generating a baseband signal according to an embodiment of the disclosure.

FIG. 8 illustrates method of generating a baseband signal according to an embodiment of the disclosure.

Referring to FIG. 8, in the existing 5G technology, if the system selects the uplink of the 5G system according to the reference signal received power (RSRP) or supplementary uplinks to transmit the random access preamble, the subsequent random access reattempt will further be performed on the selected uplink. Since the failure of a random access is likely to be caused by poor quality of the uplink channel used, restricting subsequent random access to reattempt on the same uplink as the initial random access procedure will likely cause the subsequent random access procedure to continue to fail due to the quality problem of the uplink channel, thus affecting the system performance and affecting the access experience of the terminal.

Moreover, in an existing 5G system, if there are multiple uplink channels in the system that may be used for random access procedure, and the terminal selects one of the uplink channels for random access procedure according to the RSRP, then the subsequent random access attempts will be performed on the uplink, which cannot avoid the problem that random access procedure fails to be completed due to poor quality of the selected uplink channel caused by measurement errors.

Figure 9:
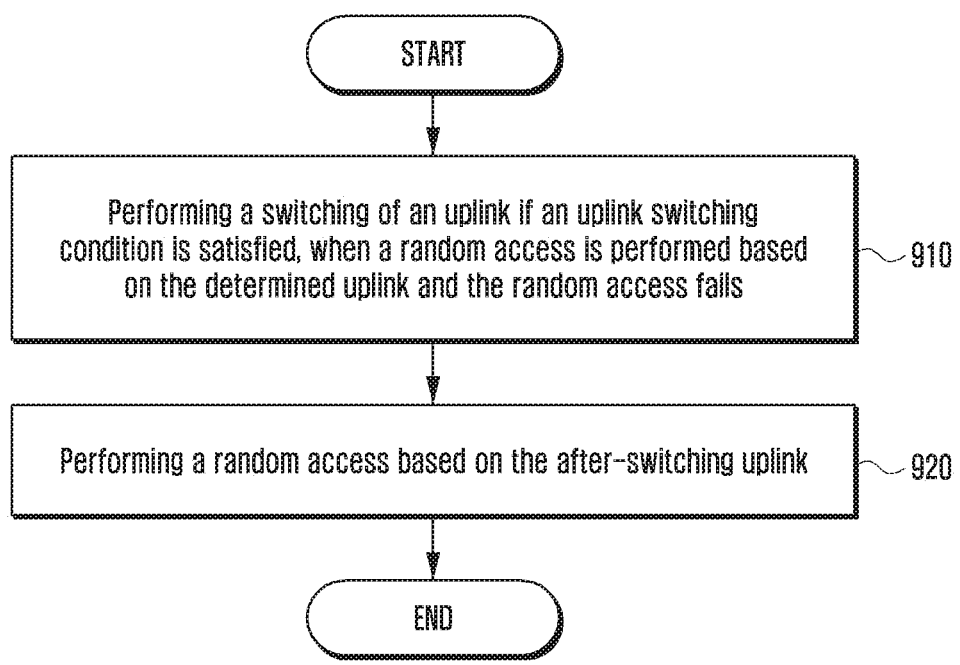
FIG. 9 illustrates a schematic flowchart of a random access method according to an embodiment of the disclosure.

FIG. 9 illustrates a schematic flowchart of a random access method according to an embodiment of the disclosure.

Referring to FIG. 9, based on the technical problems existing in the existing 5G system described above, an embodiment of the disclosure provides a random access method, as shown in FIG. 9, including operation 910: performing a switching of an uplink if an uplink switching condition is met, when a random access is performed based on the determined uplink and the random access fails, and operation 920: performing a random access based on the after-switching uplink.

The embodiment of the disclosure provides a random access method. When a random access is performed based on the determined uplink and the random access fails, a switching is performed on the link if the uplink switching condition is met, so that it can be determined in time whether the uplink switching condition is satisfied when the random access procedure attempt fails, so as to determine whether to switching to the uplink with better channel condition to perform a random access. Moreover, the transmission is switched to the link when the uplink switching condition is met, which provides a precondition for a subsequent random access based on the after-switching link, and a random access is performed based on the after-switching uplink, which enables the terminal to timely select the uplink with better channel quality to reattempt the random access procedure and perform a random access based on the after-switching uplink when the random access attempt fails, thus reducing the delay of the random access and improving the overall performance of the system.

In addition, according to the random access method provided by the implementation of the disclosure, a switching may be performed between multiple uplinks in the random access procedure, that is, when the random access procedure attempt fails, it is possible to determine in time whether a switching is performed to the uplink with better channel condition so as to obtain additional performance gain by the switching between multiple uplinks. Moreover, by adopting the method provided by the embodiment of the disclosure, when the initial random access attempt fails due to the poor quality of the initially selected uplink channel caused by the initial measurement error, the terminal may timely select the uplink with better channel quality to reattempt the random access procedure, thereby reducing the delay of random access and improving the overall performance of the system.

The random access method provided by the above implementation of the disclosure will be described as follows:

In an implementation, when the random access based on the determined uplink is the initial random access, before the random access based on the determined uplink, the method further includes:

acquiring a currently measured RSRP and at least one link selection threshold configured or preconfigured;

determining an uplink for an initial random access according to a result of comparison between the RSRP and at least one link selection threshold.

In an implementation, when the total number of random access attempts is not greater than the threshold of the total number of random access attempts configured or preconfigured by the base station, it is determined whether the uplink switching condition is satisfied according to at least one of the following:

determining according to the result of comparison between the RSRP currently measured and at least one link selection threshold configured or preconfigured;

determining according to the result of comparison between the RSRP and at least one link switching determination threshold; and determining according to the result of comparison between the number of random access attempts on the current uplink and the threshold of number of random access attempts corresponding to the uplink.

In an implementation, the method of determining at least one link switching determination threshold includes at least one of the following:

acquiring at least one link switching determination threshold configured or preconfigured;

determining according to a first preset relationship configured and at least one link selection threshold preconfigured, wherein the first preset relationship is a preset relationship between the link selection threshold and the link switching determination threshold.

In an implementation, the method of determining the threshold of number of random access attempts corresponding to the uplink includes at least one of the following:

acquiring the threshold of number of random access attempts corresponding to the uplink configured or preconfigured; and determining according to a configured second preset relationship and the preconfigured threshold of total number of random access attempts, wherein the second preset relationship is a preset relationship between the total number threshold of random access and the threshold of number of random access attempts.

In an implementation, the random access configuration information includes at least one of random access channel configuration information and random access preamble configuration information.

Wherein the random access is performed based on the random access configuration information, including at least one of the following situations:

determining the time-frequency resources of the random access channel on the after-switching uplink according to the configured random access channel configuration information, and performing a random access based on the time-frequency resources of the random access channel and the corresponding preconfigured random access preamble;

determining a preamble for random access on the after-switching uplink according to the configured random access preamble configuration information, and performing a random access based on the preamble and the preconfigured time-frequency resources of the corresponding random access channel; and determining the time-frequency resources of the random access channel according to the configured random access channel configuration information, determining the preamble for random access on the after-switching uplink according to the configured random access preamble configuration information, and performing a random access based on the time-frequency resources of the random access channel and the preamble.

In an implementation, before performing the random access based on the random access configuration information, the method further includes:

adjusting at least one of the number of random access attempts, the number of times of power ramping, and the power control parameters corresponding to the after-switching uplink.

Figure 10:
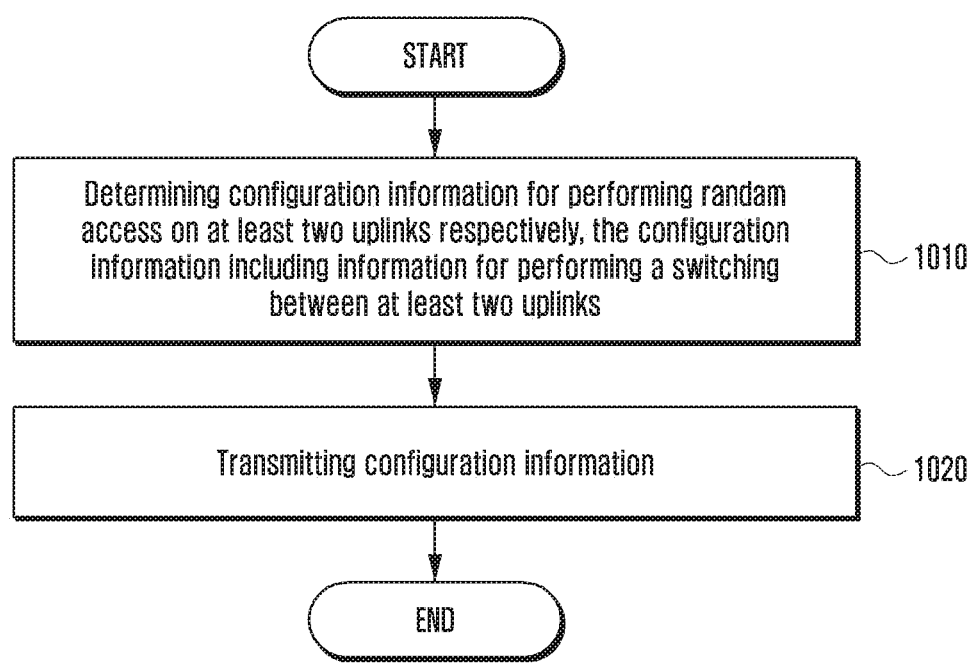
FIG. 10 illustrates a schematic flowchart of a random access method according to an embodiment of the disclosure.

FIG. 10 illustrates a schematic flowchart of a random access method according to an embodiment of the disclosure.

Referring to FIG. 10, at the same time, another embodiment of the disclosure provides a method for configuring random access information, including: operation 1010: determining relevant configuration information for performing random access on at least two uplinks respectively, wherein the configuration information includes information for performing a switching between at least two uplinks. Operation 1020: transmitting relevant configuration information.

The random access method provided by the above embodiment of the disclosure determines relevant configuration information for performing random access on at least two uplinks respectively, and the configuration information includes information for performing a switching between at least two uplinks, which provides a prerequisite guarantee for the terminal to be able to perform random access on multiple uplinks and a switching between multiple uplinks. Relevant configuration information is transmitted so that the terminal can perform a corresponding random access on multiple uplinks according to the configuration information when performing the random access.

The random access method provided by the implementation of the disclosure will be described as follows:

In an implementation, the information for performing a switching between at least two uplinks includes at least one of the following:

at least one link selection threshold;

at least one link switching determination threshold;

a first preset relationship between the link selection threshold and the link switching determination threshold;

thresholds of random access attempts corresponding to at least two uplink respectively;

a second preset relationship between the threshold of total number of random access attempts and each threshold of number of random access attempts.

wherein the configuration information further includes at least one of the following:

random access configuration information for performing random access on at least two uplinks respectively; and the threshold of total number of random access attempts.

In an implementation, the random access configuration information includes at least one of random access channel configuration information and random access preamble configuration information.

The operation of determining random access configuration information for performing random access on at least two uplinks respectively includes any of the following ways:

configuring a same random access channel configuration information and a same random access preamble configuration information for at least two uplinks;

configuring different random access channel configuration information and different random access preamble configuration information for at least two uplink configuration respectively;

configuring different random access channel configuration information and a same random access preamble configuration information for at least two uplink configuration respectively; and configuring a same random access channel configuration information and different random access preamble configuration information for at least two uplink configuration respectively.

In particular, aiming at the technical problem that it cannot perform a switching between random access channels on multiple available uplinks in the 5G prior art, and the random access method provided by the embodiment of the disclosure may perform a switching between multiple uplink random access channels, wherein the basic working principle of the random access method provided by the embodiment of the disclosure is as follows:

When the random access attempt fails, the terminal determines whether the uplink switching condition is met. If the uplink switching condition is met, the uplink is switched, and the subsequent random access reattempt is performed on a new after-switching uplink. If the uplink switching condition is not met, the subsequent random access reattempt continues on the current uplink. Wherein if the terminal performs a switching of the uplink, the terminal adjusts the configuration and parameters of the random access procedure according to the corresponding configuration information of the new after-switching uplink, and then the terminal selects a random access channel and a preamble on the after-switching new uplink according to the new configuration and parameters. Finally, the terminal initiates a random access reattempt on the new after-switching uplink and transmits a preamble on the random access channel of the selected uplink.

Hereinafter, the above embodiments of the disclosure will be fully and thoroughly described through the following several preferred implementations:

Embodiment 1

In this embodiment of the disclosure, a switching method of a random access channel in a multi-uplink system will be introduced in combination with a specific system. Assuming that there are multiple uplinks in the system, when the terminal performs initial random access procedure, it may select one of these multiple uplinks to perform a random access procedure according to RSRP.

The terminal reads the system information transmitted in master information block (MIB) or RMSI and determines the random access configuration information, including the random access channel configuration information and the random access preamble configuration information. At the same time, the system information further includes threshold information for determining the uplink. Wherein the threshold information is a single threshold or a threshold set consisting of multiple thresholds for determining an uplink for random access.

Specifically, for a system in which there are two available uplinks consisting of uplink 1 and uplink 2, the threshold 1 configured or preconfigured by the base station for determining the uplink is transmitted in the system information.

The terminal compares RSRP with the threshold 1, and if RSRP is less than the threshold 1, the uplink 1 is selected for random access. Otherwise, the uplink 2 is selected for random access.

For a system of K (K>2) available uplinks with uplink 1, . . . , uplink K, the threshold set $\{\eta_1, \text{up}\eta_{(K-1)}\}$ configured or preconfigured by the base station is transmitted in the system information. The terminal compares RSRP with the threshold in the threshold set, and if $\eta_{(k-1)} \leq \text{RSRP} < \eta_k$, the uplink k is selected, wherein $1 \leq k \leq K-1$. If the RSRP>$\eta_{(K-1)}$, then the uplink K is selected.

Assuming that the terminal selects the uplink k for random access procedure according to the RSRP, the terminal determines the time-frequency resources of the random access channel according to the random access configuration information in the system information and according to the synchronization signal block selected by the RSRP, and randomly selects a preamble with equal probability among the available preambles according to the random access preamble configuration information.

The terminal transmits the selected preamble on the time-frequency resources of the random access channel on the selected uplink to complete the transmission of the preamble.

Due to measurement problems or channel quality problems, the random access procedure performed by the terminal selecting uplink k may fail, for example, a random access response cannot be detected. Or, a random access response is detected, but the preamble identifier contained therein does not match the transmitted preamble. Or, the random access response is successfully detected, and the preamble identifier therein matches the transmitted preamble, but the transmission of message 3 times out. Or the terminal identification in the conflict resolution response received after transmitting message 3 does not match. After the failure of the random access procedure, the terminal will perform power ramping and try a random access again with new power.

For the problem that the random access attempts of the terminal continue to fail due to poor channel quality, it is possible to introduce a switching between the uplinks. Specifically, if the previous random access attempt fails, the uplink for the subsequent random access attempt may be selected for switching. The brief process is as follows:

the random access of the terminal fails previously;

the terminal determines the link switching condition;

if the link switching condition is met, performing a switching to a new uplink and reattempting a random access; otherwise, reattempting a random access on the current link.

Figure 11:
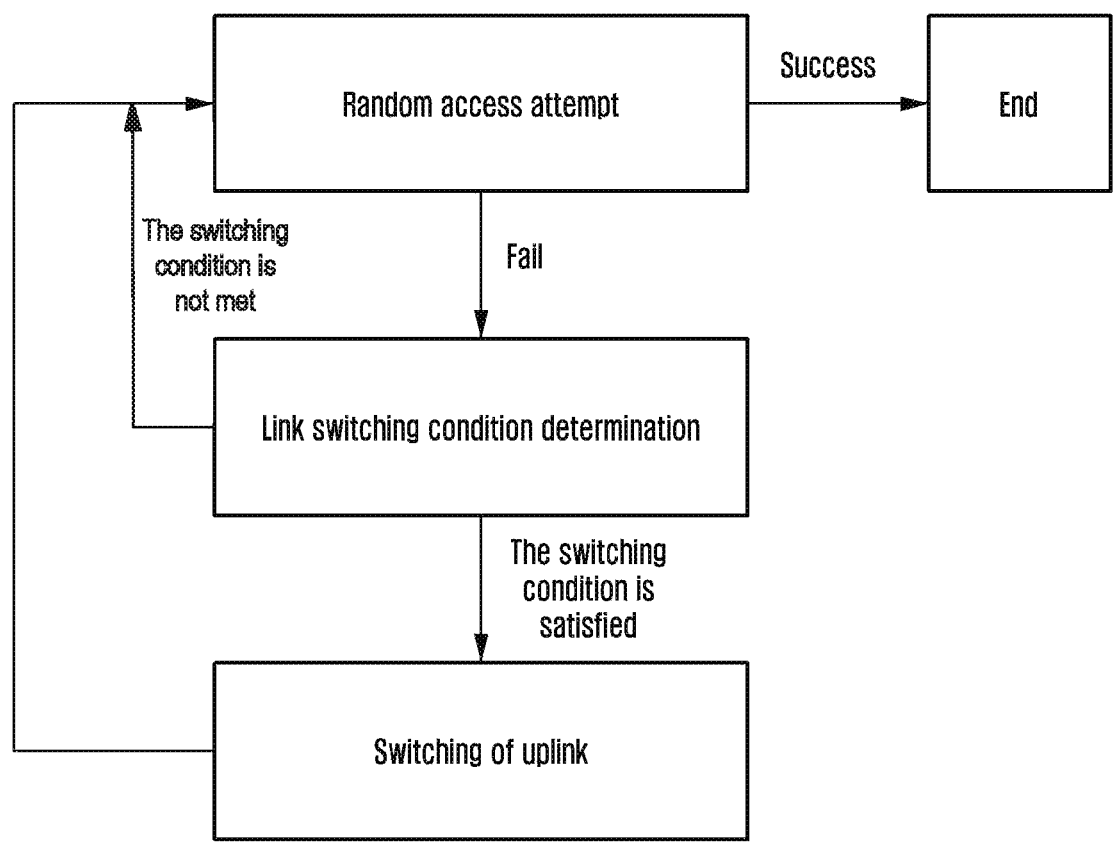
FIG. 11 illustrates a schematic diagram of a basic process of a random access method according to an embodiment of the disclosure.

Wherein, the above flow may be briefly described with the flow chart shown in FIG. 11.

FIG. 11 illustrates a schematic diagram of a basic process of a random access method according to an embodiment of the disclosure.

Referring to FIG. 11, it should be noted that the implementation premise of the uplink switching procedure is that the total number of random access attempts performed by the terminal does not exceed the maximum number of random access attempts configured or preconfigured by the base station (i.e., the threshold of total number of random access attempts configured or preconfigured by the base station, e.g., $N_{max}$).

The above uplink switching condition may be as follows:

1. The Terminal Uses the RSRP as the Uplink Switching Condition.

Specifically, one possible way is that the terminal periodically performs uplink measurements and compares the measurement results (i.e., RSRP) with the previously configured or preconfigured thresholds or threshold sets. If it is found that the RSRP measured last time no longer meets the condition for selecting the current link, it is considered that the link switching condition is met, a new uplink is selected, and a new random access procedure attempt is performed. Otherwise, it is considered that the link switching condition is not met, and the random access procedure attempt on the current uplink will continue. When the random access attempt fails, the terminal selects a new uplink according to the RSRP measured last time and the configured or preconfigured threshold or threshold set mentioned above, and performs a random access procedure reattempt on the new uplink.

A simple example is as follows:

In the initial random access procedure attempt, the terminal selects the uplink k according to the aforementioned uplink selection criteria. When the uplink random access procedure fails (including the case of multiple failures), the terminal performs uplink measurement and finds that the measurement result (RSRP) no longer meets the selection condition of uplink k, then it is considered as triggered uplink switching. The terminal selects a new uplink according to the RSRP and the previously configured or preconfigured threshold set. For example, the terminal selects uplink q for subsequent random access attempts if the terminal obtains $\{\eta_{q-1} \leq RSRP < \eta_q\}$ according to the RSRP and the comparison between the threshold sets.

It should be noted that the above measurement results are the downlink measurements, and the corresponding uplink is selected based on the RSRP obtained from the downlink measurements.

Another possible way is for the base station to configure or preconfigure another threshold or threshold set for the determination of uplink switching. Specifically, if there are two uplinks, the threshold 2 is configured or preconfigured. If the uplink that was previously selected is less than the threshold 1, the link switching condition is that the last measurement result (RSRP) is not less than the threshold 2. If the uplink that was previously selected is not less than the threshold 1, the link switching condition is that the last measurement result is greater than the threshold 2.

If there are K uplinks, a threshold set $\{\delta_1, \ldots, \delta_{K-1}\}$ for uplink switching determination is configured or preconfigured, that is, a link switching determination threshold set $\{\delta_1, \ldots, \delta_{K-1}\}$ is defined. Specifically, if the uplink k (k<K) was selected last time, then the switching determination condition is that the RSRP measured last time does not meet $\delta_{k-1} \leq RSRP < \delta_k$. If this condition is not met, then the uplink switching is performed, otherwise, subsequent random access procedure attempts are performed on the current link. If the uplink K was previously selected, the switching determination condition is that $RSRP \geq \delta_{K-1}$ should be met. If this condition is not met, the uplink switching is performed, otherwise, subsequent random access procedure attempts are performed on the current link. In the above way, when the uplink is reselected, it may be based on the threshold set $\{\eta_1, \ldots, \eta_{K-1}\}$ configured or preconfigured by the base station. At this time, $\{\eta_1, \ldots, \eta_{K-1}\}$ will be defined as the link selection threshold set, while $\{\delta_1, \ldots, \delta_{K-1}\}$ will be defined as the link switching determination threshold set. If the uplink is reselected, it may further be based on the new threshold set $\{\delta_1, \ldots, \delta_{K-1}\}$ (i.e., the link switching determination threshold set).

In this method, the threshold or threshold set for determining uplink switching may be separately configured and informed in the RMSI, and may further have a fixed relationship with the initially defined threshold or threshold set. For example, parameters Δ are configured or preconfigured in MIB or the RMSI to describe the relationship between the threshold or threshold set (i.e., link switching determination thresholds) for determining uplink switching and the initially defined threshold or threshold set (i.e., link selection thresholds). For example, for a system consisting of two uplinks, the relationship between threshold 1 and threshold 2 is:

threshold 2=threshold 1+Δ

For a system consisting of k uplinks, the relationship between the threshold set $\{\delta_1, \ldots, \delta_{K-1}\}$ and the threshold set $\{\eta_1, \ldots, \eta_{K-1}\}$ is:

$$\delta_k = \eta_k + \Delta$$

wherein, $1 \leq k \leq K$.

In this way, the parameters Δ may be configured together with the aforementioned thresholds or threshold set through the MIB or RMSI, or the terminal may be informed in a predefined or preconfigured way. The terminal determines a threshold or threshold set for uplink switching according to the aforementioned method based on the preconfigured or configured threshold or threshold set and the preconfigured or configured parameters Δ.

In another possible way, when the random access procedure fails, the downlink is measured to determine whether an uplink switching is required. The switching criteria in the two ways mentioned above may be used.

2. The Terminal Will Use the Number of Random Access Attempts on the Selected Uplink as the Switching Condition.

Specifically, the base station configures or preconfigures the maximum number of random access attempts performed on the selected uplink $M_{max}$ (i.e., the threshold of number of random access attempts corresponding to the uplink). If the number of random access attempts performed on the uplink reaches the configured or predefined maximum number (i.e., the threshold of number of random access attempts), then it is considered that the link switching condition is satisfied and the uplink switching will be performed.

Further, a possible way is to count random access attempts performed on the selected uplink, and if the count reaches $M_{max}$, a switching is performed on the link. The random access attempts on the selected uplink are counted, including the following ways:

(1) a separate counter may be set up for each uplink, and each counter is initialized to 1 when initializing a random access. For the selected uplink for random access procedure, the counter corresponding to the uplink is used to count the number of random access attempts performed on the link. If the counter reaches $M_{max}$, the link switching is performed. After the uplink switching, the counter used in the original uplink is reset to 0 or remains unchanged.

(2) a counter for uplink counting is established, in which the counter is initialized to 1 when initializing a random access, and the counter records the random access attempt performed by the uplink after an uplink random access attempt is selected. If the counter reaches $M_{max}$, the link switching is performed. After the link switching, the counter is reset to 1 and the number of random access attempts on the new uplink is recorded.

For uplink reselection, a rule may be predefined: If the system includes two uplinks, when the uplink is reselected, another uplink other than the current uplink is selected for the random access reattempt. If the system includes multiple uplinks, it may choose to reattempt the random access procedure near the uplinks. For example, if the uplink k is selected, the uplink k−1 or the uplink k+1 will be selected when the uplink is reselected.

(3) if there are two available uplinks, the counter for uplink random access may not be defined separately, but the transmission counter used by the random access procedure may be used to determine the uplink switching. A simple method is that the terminal completes initialization of the random access procedure and selects the uplink 1 to make random access attempts according to the measurement results. The terminal transmits the preamble on the uplink 1 and starts counting of the transmission counter. Until the transmission counter reaches $M_{max}$, random access re-attempts caused by random access procedure failure are all performed on the uplink 1. If it is found that the transmission counter reaches $M_{max}$ during the resource selection of random access reattempt, the transmission is switched to the uplink 2, the time-frequency resources of the random access channel and the preamble are selected according to the random access configuration information, and the subsequent random access reattempt is performed on the uplink 2.

For the case where there are only two uplinks in the system, the random access attempt counter may be used instead of the counter for recording random access attempts performed on the selected uplink. In this case, another criterion for determining whether to perform an uplink switching is that if the value N of the random access attempt counter meets:

$$\mod(N, M_{max}) = 0$$

then an uplink switching is performed, otherwise, a reattempt of the random access procedure is continued on the currently selected uplink.

The aforementioned parameters $M_{max}$ of the number of attempts to perform the random access procedure on the selected uplink may be configured and informed in the MIB or RMSI, or may be configured in a predefined way. In other configuration way, the relationship between the parameters $M_{max}$ (that is, the threshold of number of random access attempts corresponding to the uplink) and the maximum total number of times of number of random access attempts $N_{max}$ (that is, the threshold of total number of random access attempts) configured or preconfigured by the base station may be defined. For example, a simple way is that the relationship between the parameters $M_{Max}$ and $N_{max}$ (which are configured or preconfigured by the base station) is:

$$M_{max} = [N_{max}/K],$$

where K is an integer and the symbol [•] is a rounding operation, which may be replaced by rounding down or rounding up. The parameter k may be configured by a base station configuration or a predefined way, or configured and informed in the MIB or RMSI.

3. Combination of the Above Two Ways.

When a random access procedure attempt is performed on the selected uplink, if the number of attempts reaches $M_{max}$ (i.e., the threshold of number of random access attempts corresponding to the uplink) configured or preconfigured by the base station, it is determined whether an uplink switching is necessary based on the last measurement result.

For counting the number of times of random access procedure attempts on the selected uplink, the method described in the aforementioned method 2 may be used, i.e., counting each uplink setting counter, or setting an uplink counter, which is set to zero when the uplink switching is performed. For a system with only two uplinks, the random access procedure counter may be used instead of the uplink counter. The setting of parameters $M_{max}$ may be informed by configuration or pre-configuration of the base station, or may be informed or configured indirectly by the base station which configures or preconfigures the relationship of the $M_{max}$ and the maximum total number of random access attempts N_max.

If the number of random access attempts performed on the selected uplink reaches $M_{max}$, the latest measurement result (for example, RSRP) is compared with the threshold or threshold set configured or preconfigured by the base station to determine whether the uplink switching is required. The configuration and notification of the threshold or threshold set configured or preconfigured by the base station may adopt the way in the aforementioned method 1.

If the number of attempts reaches $M_{max}$ and the latest measurement result meets the uplink switching condition, then a new uplink may be selected for switching using the criteria in the aforementioned method 1. If the number of attempts reaches $M_{max}$, but the latest measurement result does not meet the uplink switching condition, then an uplink switching is not performed, then the counter used to perform random access attempt counting on the selected uplink may be reset to 1 or no additional processing will be performed on the counter.

For the case where there are only two uplinks in the system, the random access attempt counter may be used instead of the counter for recording random access attempts performed on the selected uplink. In this case, another criterion for determining whether to perform the uplink switching is that if the value N of the random access attempt counter meets:

$$\mod(N, M_{max}) = 0$$

Then it is determined whether the uplink switching is necessary according to the latest measurement result. Wherein the counter N is counted whether the link switching is performed or not.

Embodiment 2

In the second embodiment, a method of random access procedure uplink switching will be introduced in combination with a specific system. Embodiment 1 shows a general example, and this embodiment will explain an uplink switching method in combination with the case where there are both a common uplink and a supplementary uplink in a 5G system.

In the second embodiment, it is assumed that there are two uplinks in the system, in which one is a common uplink for normal uplink data transmission of the system, and the other is a supplementary uplink, which is used to provide an uplink channel for terminals with poor channel quality so as to facilitate access and data transmission of these terminals. The base station configures random access channel configuration information, random access preamble configuration information, and threshold configuration information in the MIB or RMSI to determine whether to perform a random access attempt on the supplementary uplink.

After receiving the configuration information, the terminal compares the RSRP measured on the downlink with the threshold, and if the RSRP is less than the threshold, selects to perform a random access attempt on the supplementary uplink. If the RSRP is not less than the threshold, the terminal selects to perform a random access attempt on the common uplink. For the random access attempt performed on the supplementary uplink, subsequent random access reattempts caused by failure of a random access will further be performed on the supplementary uplink, while the random access attempt on the common uplink may trigger an uplink switching when the random access attempt fails, a switching is performed to the supplementary uplink to continue a subsequent random access reattempt.

The following content mainly discusses the process of selecting the initial random access procedure to be performed on the common uplink and a switching being performed to the supplementary uplink during the subsequent random access reattempt.

If the random access attempt fails in the random access procedure on the common uplink and the number of random access attempts does not exceed the maximum number of random access attempts configured by the system, it is determined whether the uplink switching condition is met. If the uplink switching condition is met, a switching is performed to the supplementary uplink, and subsequent random access reattempts are all performed on the supplementary uplink. If the uplink switching condition is not met, the random access reattempt continues on the common uplink.

Similar to Embodiment 1, the uplink switching condition may be in the following ways:

1. The Terminal Periodically Measures the Downlink, for Example, Measures a Synchronization Signal Block of the Downlink to Obtain a Corresponding RSRP.

If the random access attempt fails, the terminal compares the last RSRP with the link selection threshold η configured or preconfigured by the base station for selecting the uplink. If the RSRP<η, it is considered that the current common uplink is no longer suitable for the random access attempt of the terminal, and the next random access reattempt will be performed on the supplementary uplink. If RSRP≥η, the next random access reattempt is still performed on the common uplink.

In another way, when the base station configures or preconfigures a link switching determination threshold δ for determining whether to perform a switching of the uplink, meanwhile the random access attempt performed on the common uplink fails, and the number of random access attempts does not exceed the maximum number configured or preconfigured by the base station, the last measured RSRP is compared with the link switching determination threshold δ for determining the uplink switching, and if the RSRP<δ, the next random access reattempt will be performed by switching to the supplementary uplink. If the RSRP≥δ, the next random access reattempt will be performed on the common uplink.

It should be noted that the newly defined link switching determination threshold δ for determining whether the uplink is switched may be configured and informed by the base station in MIB or RMSI, or may be configured and informed by configuring or preconfiguring the relationship between the link switching determination threshold δ and the link selection threshold q for initially selecting the uplink. Specifically, parameters Δ may be preconfigured or configured and informed, and a link switching determination threshold δ for determining whether the uplink is switched according to the following relationship:

$$\delta = \eta + \Delta$$

In another method, if the random access attempt performed by the terminal on the common uplink fails, the downlink is measured, and whether uplink switching is required is determined based on the comparison of the RSRP measured this time with the threshold configured or preconfigured by the base station.

2. An Uplink Switching is Determined Whether to be Required According to the Number of Random Access Attempts on the Common Uplink.

Specifically, a counter for counting the number of random access attempts is used and a parameter $M_{max}$ (i.e., a threshold of number of random access attempts corresponding to the uplink) is preconfigured. If the random access attempt fails and the counter for counting the number of random access attempts reaches $M_{max}$, the next random access reattempt will be performed by switching to the supplementary uplink.

3. The Combination of the Above Two Ways. For Example, when the Random Access Attempts Performed on the Common Uplink Reaches the Preconfigured or Configured Number, the Last Downlink Measurement Result (RSRP) is Compared with the Preconfigured Threshold, and if the Link Switching Condition is Met, the Subsequent Random Access is Performed on the Supplementary Uplink. Otherwise, the Next Random Access Procedure Reattempt Will be Performed on the Common Uplink.

Specifically, the base station may configure or preconfigure the parameter M to determine whether to perform an uplink switching once for every M attempts in the random access procedure on the common uplink.

One implementation is to configure or preconfigure a test interval counter, which is initialized to 1 when the random access procedure is initialized, and is incremented every time the random access attempt fails and determined whether the counter reaches M or not. If the counter does not reach M, the next random access reattempt is still performed on the common uplink. If the counter reaches M, it is determined whether to perform a link switching or not according to the RSRP obtained from the latest measurement and the threshold configured or preconfigured by the base station.

Another implementation is to directly use the counter value N for recording the number of random access attempts. If the random access procedure performed on the common uplink fails and the random access attempt number counter does not reach the maximum number of attempts configured or preconfigured by the base station, then:

If mod(N,M)≠0, the next random access reattempt continues on the common uplink.

If mod(N,M)=0, it is determined whether a link switching is required according to the RSRP measured recently and the preconfigured or configured threshold.

Wherein the parameter M may be configured or preconfigured by the base station or has a fixed relationship with the maximum number $N_{max}$ of random access attempts configured or preconfigured by the base station, for example, $M=[N_{max}/K]$. Where K is an integer, the rounding operation in the above equation may be replaced by rounding down or rounding up. K may be configured and informed by the base station in the MIB or RMSI or set in a predetermined way.

In the above method, the method described in method 1 in this embodiment may be used to determine whether the uplink is switched by the RSRP and the preconfigured or configured threshold.

Embodiment 3

In this embodiment, an uplink switching method of a random access procedure will be introduced in combination with a specific system. The switching criteria for the terminal to perform on uplink in multiple uplinks are introduced in Embodiment 1 and Embodiment 2, and the corresponding random access method after performing an uplink switching will be introduced in this embodiment.

When performing a random access procedure on a system supporting multiple uplinks, the terminal first selects an appropriate synchronization signal block according to the measurement result (RSRP), and reads random access configuration information in MIB or RMSI, including random access channel configuration information, random access preamble configuration information, and threshold information for selecting an uplink.

The terminal selects the uplink for performing the random access procedure according to the RSRP and threshold information, obtains the time-frequency resources of the random access channel in the uplink from the random access configuration information, and selects the random access preamble. The terminal transmits a preamble on a random access channel on the selected uplink.

The terminal performs random access attempts on the selected uplink, and if the random access attempts fail and the number of random access attempts does not reach the maximum number of random access attempts configured or preconfigured by the base station, it is determined whether an uplink switching is required. Whether an uplink switching is required may be performed in the manner described in embodiments 1 and 2. If the uplink switching is not performed, the random access attempts continue on the current uplink.

If the uplink switching is performed, it is necessary to perform a switching to a new uplink and continue random access attempts. If an uplink switching is required, some parameters and configuration of the random access procedure need to be adjusted. The parameters and configuration that need to be adjusted include: a preamble transmission number counter, a power ramping counter, random access channel configuration, preamble configuration, etc.

1. Preamble Transmission Number Counter

This counter is used to count the number of random access attempts performed by the terminal. Possible behaviors of the preamble transmission number counter when an uplink switching occurs include:

1a. keep unchanged, that is, the uplink switching does not affect the counting of the number of the preamble transmissions, which is still counted according to a normal random access procedure.

1b. reset, that is, the number of the preamble transmissions is reinitialized to 1 after the uplink switching. In this processing way, one possible subsequent processing is to reset only the number of the preamble transmissions to 1, but does not affect the selection and processing of other parameters and configuration. Another possible follow-up processing is to reinitialize the entire random access procedure, reset the power ramping counter to 1, and reselect the time-frequency resources of the random access channel and the random access preamble according to the random access configuration information.

2. Power Ramping Counter

This counter is used to compute the power ramping during a random access reattempt. Possible behaviors of the power ramping counter when an uplink switching occurs include:

2a. keep unchanged, that is, the uplink switching does not affect the counting of the power ramping counter, which is still counted according to a normal random access procedure.

2b. reset, that is, the counting of the power ramping counter is reset to 1 after the uplink switching.

3. Random Access Configuration Information

If different uplinks use uniform random access configuration information, the terminal does not need to adjust the random access configuration information when performing a switching on the uplink, and only needs to select the time-frequency resources of the random access channel on the after-switching uplink according to the random access channel configuration information contained in the random access configuration information.

If the random access configuration information used by different uplinks is different, random access configuration information, including random access channel configuration information and random access preamble configuration information of each link, is respectively configured for each uplink in the RMSI or MIB. After a switching is performed to a new uplink, corresponding random access configuration information is selected on the selected uplink according to the random access configuration information corresponding to the selected uplink, and time-frequency resources of the random access channel are determined. In addition, a preamble with equal probability is selected from the random access preamble resource pool according to the random access preamble information, and the selected preamble is transmitted on the time-frequency resources of the random access channel on the selected uplink.

For the case that the random access configuration information used by different uplink is not the same, it further includes the uniform configuration of part of the configuration information and the separate configuration of part of the configuration information for different uplinks. For example, one possible way is as follows: different uplinks use uniform random access channel configuration information and use different random access preamble configuration information. At this time, the terminal selects time-frequency resources of the random access channel on the newly selected uplink after switching according to the uniform random access channel configuration information, and randomly selects a preamble from the corresponding preamble resource pool with equal probability according to the selected uplink and the preamble configuration information corresponding to the uplink. Thereafter, the terminal transmits the preamble on the random access channel on the selected uplink.

Another possible way is to use uniform preamble configuration information and different random access channel configuration information for different uplinks. At this time, the terminal randomly selects a preamble with equal probability from the corresponding preamble resource pool according to the uniform preamble configuration information, and determines the time-frequency resources of the random access channel on the selected uplink according to the selected uplink and the random access channel configuration information corresponding to the uplink. Thereafter, the terminal transmits the preamble on the random access channel on the selected uplink.

It should be noted that the random access channel configuration information in the above description includes information of the time-frequency resources of the random access channel, subcarrier spacing, preamble format information, etc. The preamble configuration information includes sequence generation information, such as root sequence configuration information and cyclic shift configuration information.

4. Power Configuration

Different uplink random access procedures may use different power control parameters, for example, different uplink may use different target reception powers and power ramping parameters. Power control parameters of different uplinks may be configured and informed in MIB or RMSI. When the switching is performed for the terminal to a new uplink and the preamble is prepared to be transmitted, the transmission power of the preamble is computed according to the power control configuration parameters (such as target reception power and power ramping parameters) corresponding to the selected uplink and the value of the power ramping counter, and the transmission power of the preamble is adjusted according to the parameters.

It should be noted that the above four configuration parameters that may be adjusted during uplink switching may be used in combination.

A special example of this embodiment is a system that includes both a common uplink and a supplementary uplink in a 5G system. The common uplink is used for the normal uplink data transmission of the system, while the supplementary uplink is used for providing uplink channels for terminals with poor channel quality so as to facilitate the access and data transmission of these terminals. When configuring and notifying the random access configuration information, the base station may only configure or preconfigure one random access configuration information, including random access channel configuration information, random access preamble configuration information, and threshold information for selecting an uplink. For example, when configuring and notifying the random access configuration information, the base station may only configure the random access channel configuration information, and preconfigure the random access preamble configuration information, or the base station may only configure the random access preamble configuration information and pre-configure the random access channel configuration information. In addition, the base station may further configure both the random access channel configuration information and the random access preamble configuration information.

When transmitting the configuration information, the base station may only configure or preconfigure a set of random access configuration information. In this case, the common uplink and the supplementary uplink use the same random access configuration information configured or preconfigured by the base station. The base station may configure or preconfigure two sets of random access configuration information, one set for random access procedure on the common uplink and one set for random access procedure on the supplementary uplink. The terminal selects the uplink that initiates the random access procedure through the measurement of the downlink and the threshold information configured or preconfigured by the base station, and selects the random access channel and the random access preamble according to the random access configuration information of the corresponding link.

If the terminal selects the common uplink for random access attempt during initialization, but triggers the uplink switching condition during the random access procedure attempt, a switching will be performed for the terminal to the supplementary uplink for subsequent random access procedure reattempts. The parameters and configuration information of the random access procedure will be adjusted during the switching, including: preamble transmission number counter, power ramping counter, random access channel configuration, preamble configuration, etc. The adjustment of these parameters and configuration information may be performed in the manner described above in this embodiment.

It should be noted that the random access procedure in the embodiment of the disclosure may be a competition-based random access procedure or a competition-free random access procedure. For the contention-free random access procedure, both the random access channel and the random access preamble may be directly configured by the base station. The random access channel and the preamble on the two uplinks may be configured to be the same or different.

The downlink measurement information described in the disclosure may be obtained by measuring a synchronization signal block. Specifically, the synchronization signal block within the synchronization signal block period in the cell is measured to obtain the corresponding RSRP and the average value to serve as the RSRP of the measurement result. For example, the measurement result in this case is the average RSRP. In another way, the synchronization signal block selected by the terminal may be measured, and the RSRP measured by the synchronization signal block is used as the RSRP for determining whether a switching is performed for the uplink or not.

For a terminal in a synchronous state, a channel state information reference signal (CSI-RS) may be used for measurement, and the obtained RSRP may be used as a basis for determining whether a switching is performed for the uplink or not. Specifically, CSI-RSs corresponding to all downlink beams may be measured, the RSRP obtained may be averaged, and the average RSRP may be used as the basis for determining whether a switching is performed for the uplink or not. Or, the CSI-RS selected by the terminal/ configured by the base station is measured, and the RSRP obtained by measurement is directly used.

Based on the above description, it may be seen that the random access method provided in the embodiment of the disclosure may perform an uplink switching in a random access procedure. Wherein, a new uplink is selected, when the random access procedure fails and a random access reattempt is to be initiated, through the measurement of the downlink. Moreover, the method provided by the embodiment of the disclosure is suitable for the situation that multiple uplinks exist in the system, and may effectively avoid the problem that the random access procedure continues to fail due to poor quality of the selected uplink channel when multiple uplinks exist in the system. At the same time, the method further avoids the problem of significant interference to other terminals that need to be accessed due to the high power ramping caused by multiple attempts on the same uplink.

Figure 12:
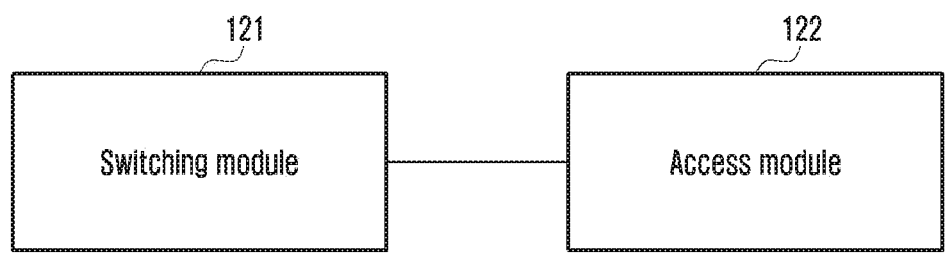
FIG. 12 illustrates a schematic diagram of a basic structure of a terminal device according to an embodiment of the disclosure.

Another embodiment of the disclosure provides a terminal device, as shown in FIG. 12, including: A switching module 121 and an access module 122, wherein the switching module 121 is configured to perform a switching on the uplink if the uplink switching condition is satisfied when a random access is performed based on the determined uplink and the random access fails. The access module 122 is configured to perform a random access based on the after-switching uplink.

FIG. 12 illustrates a schematic diagram of a basic structure of a terminal device according to an embodiment of the disclosure.

Referring to FIG. 12, specifically, when the threshold of total number of random access attempts is not greater than the configured or preconfigured number of random access thresholds, the switching module 121 is specifically configured to determine whether the uplink switching condition is satisfied according to at least one of the following: determining according to the result of comparison between the RSRP currently measured and at least one link selection threshold configured or preconfigured; determining according to the result of comparison between the RSRP and at least one link switching determination threshold; and determining according to the result of comparison between the number of random access attempts on the current uplink and the threshold of number of random access attempts corresponding to the uplink.

Further, the way in which the switching module 121 determines at least one link switching determination threshold includes at least one of the following: acquiring at least one link switching determination threshold configured or preconfigured; determining according to a first preset relationship configured and at least one link selection threshold preconfigured, wherein the first preset relationship is a preset relationship between the link selection threshold and the link switching determination threshold.

Further, the way in which the switching module 121 determines the threshold of number of random access attempts corresponding to the uplink includes at least one of the following: acquiring the threshold of number of random access attempts corresponding to the uplink configured or preconfigured; determining according to a configured second preset relationship and the preconfigured threshold of total number of random access attempts, wherein the second preset relationship is a preset relationship between the threshold of total number of random access attempts and the threshold of number of random access attempts.

Further, the access module 122 is specifically configured to acquire random access configuration information corresponding to the after-switching uplink; and perform a random access based on the random access configuration information.

Further, when the random access configuration information includes at least one of random access channel configuration information and random access preamble configuration information, the access module 122 is specifically configured to in at least one of the following situations: determine the time-frequency resources of the random access channel on the after-switching uplink according to the configured random access channel configuration information, and perform a random access based on the time-frequency resources of the random access channel and the corresponding preconfigured random access preamble; determine a preamble for random access on the after-switching uplink according to the configured random access preamble configuration information, and perform a random access based on the preamble and the preconfigured time-frequency resources of the corresponding random access channel; and determine the time-frequency resources of the random access channel according to the configured random access channel configuration information, determine the preamble for random access on the after-switching uplink according to the configured random access preamble configuration information, and perform a random access based on the time-frequency resources of the random access channel and the preamble.

Further, the access module 122 is further configured to adjust at least one of the number of random access attempts, the number of times of power ramping, and the power control parameters corresponding to the after-switching uplink before performing random access based on the random access configuration information.

The embodiment of the disclosure provides a random access method. When a random access is performed based on the determined uplink and the random access fails, if the uplink switching condition is met, a switching is performed on the link, so that when the random access procedure attempt fails, whether the uplink switching condition is satisfied is determined in time, so as to determine whether a switching may be performed to the uplink with better channel condition so as to perform a random access. Moreover, when the switching condition of the uplink are met, a switching is performed on the link, which provides a prerequisite guarantee for the subsequent random access based on the after-switching link, and a random access is performed based on the after-switching uplink. In this way, when the random access attempt fails, the terminal may timely select the uplink with better channel quality to perform a random access procedure reattempt, and a random access is performed based on the after-switching uplink, thus reducing the delay of random access and improving the overall performance of the system.

Figure 13:
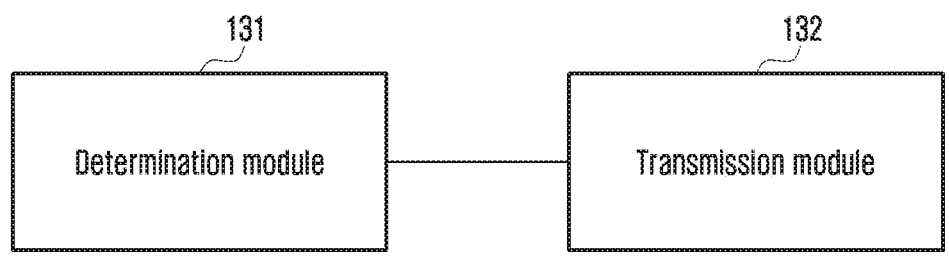
FIG. 13 illustrates a basic structural diagram of a base station according to an embodiment of the disclosure.

Yet another embodiment of the disclosure provides a base station, as shown in FIG. 13, including a determination module 131 and a transmission module 132. Wherein the determination module 131 is configured to determine relevant configuration information for performing random access on at least two uplinks, the configuration information including information for performing a switching between at least two uplinks. The transmission module 132 is configured to transmit the configuration information.

FIG. 13 illustrates a basic structural diagram of a base station according to an embodiment of the disclosure.

Referring to FIG. 13, specifically, the information for performing a switching between at least two uplinks determined by the determination module 131 includes at least one of the following: at least one link selection threshold; at least one link switching determination threshold; a first preset relationship between the link selection threshold and the link switching determination threshold; thresholds of random access attempts corresponding to at least two uplinks respectively; and a second preset relationship between the threshold of total number of random access attempts and each threshold of number of random access attempts. The configuration information further includes at least one of the following: random access configuration information for performing random access on at least two uplinks respectively; and the threshold of total number of random access attempts.

Further, the random access configuration information includes at least one of random access channel configuration information and random access preamble configuration information. The determination module 131 determines random access configuration information for performing random access on at least two uplinks, including any of the following ways:

configuring the same random access channel configuration information and the same random access preamble configuration information for at least two uplinks;

configuring different random access channel configuration information and different random access preamble configuration information for at least two uplink configuration respectively;

configuring different random access channel configuration information and the same random access preamble configuration information for at least two uplink configuration respectively; and configuring the same random access channel configuration information and different random access preamble configuration information for at least two uplink configuration respectively.

In the embodiment of the disclosure, relevant configuration information for performing random access on at least two uplinks is determined, and the configuration information includes information for performing a switching between at least two uplinks, which provides a prerequisite guarantee for the terminal to be able to perform random access on multiple uplinks and a switching between multiple uplinks.

The configuration information is transmitted so that the terminal can perform a corresponding random access on multiple uplinks according to the configuration information when performing the random access.

Yet another embodiment of the disclosure provides a terminal device including a processor; and a memory configured to store machine-readable instructions that, when executed by the processor, cause the processor to perform the random access method described above.

Yet another embodiment of the disclosure provides a base station including a processor; and a memory configured to store machine-readable instructions that, when executed by the processor, cause the processor to perform the method for configuring random access information.

Figure 14:
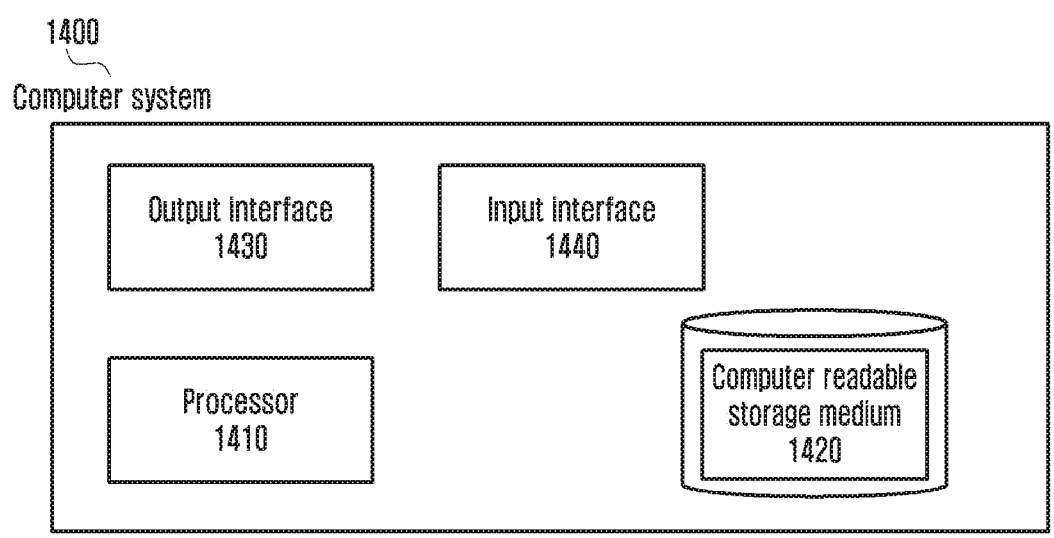
FIG. 14 illustrates a block diagram of a computing system that may be used to implement a base station or UE according to an embodiment of the disclosure.

FIG. 14 illustrates a block diagram of a computing system that may be used to implement a base station or UE of the disclosure according to an embodiment of the disclosure.

Referring to FIG. 14, a computer system 1400 includes a processor 1410, a computer readable storage medium 1420, an output interface 1430, and an input interface 1440. The computing system 1400 may perform the method described above with reference to FIG. 9 or FIG. 10 to configure a reference signal and perform data transmission based on the reference signal.

Specifically, the processor 1410 may include, for example, a general purpose microprocessor, an instruction set processor, and/or an associated chipset and/or an application specific microprocessor (e.g., an application specific integrated circuit (ASIC)), etc. The processor 1410 may further include an on-board memory for caching purposes. The processor 1410 may be a single processing unit or multiple processing units for performing different actions of the method flow described with reference to FIG. 9 or FIG. 10.

The computer readable storage medium 1420 may be, for example, any medium capable of containing, storing, transmitting, propagating, or transmitting instructions. For example, readable storage media may include, but are not limited to, electrical, magnetic, optical, electromagnetic, infrared, or semiconductor system, apparatus, devices, or propagation media. Specific examples of the readable storage media include: a magnetic storage device, such as a magnetic tape or a hard disk (hard disk drive (HDD)), an optical storage device, such as an optical disc (compact disc (CD)-read only memory (ROM)); memory, such as a random access memory (RAM) or a flash memory; and/or wired/wireless communication links.

The computer readable storage medium 1420 may include a computer program that may include code/computer executable instructions that, when executed by the processor 1410, cause the processor 1410 to perform, for example, the method flow described above in connection with FIG. 9 or FIG. 10 and any variations thereof.

The computer program may be configured to have computer program code including, for example, a computer program module. For example, in an example embodiment, the code in the computer program may include one or more program modules, including, for example, module 1, module 2 .... It should be noted that the division mode and number of modules are not fixed, and those skilled in the art may use suitable program modules or program module combinations according to the actual situation. When these program module combinations are executed by the processor 1410, the processor 1410 may perform, for example, the method flow described above in connection with FIG. 9 or FIG. 10 and any variations thereof.

According to an embodiment of the disclosure, the processor 1410 may use the output interface 1430 and the input interface 1440 to execute the method flow described above in connection with FIG. 9 or FIG. 10 and any variations thereof.

In accordance with an aspect of the disclosure, a method by terminal is provided. The method includes receiving, from a base station, first information related to a length of a random access preamble and a first subcarrier spacing of a random access channel, receiving, from the base station, second information related to a second subcarrier spacing of a physical uplink shared channel (PUSCH), identifying an offset parameter based on the length of the random access preamble, the first subcarrier spacing, and the second subcarrier spacing, the offset parameter being used to identify a frequency resource of the random access channel, and transmitting the random access preamble based on the offset parameter.

In accordance with an aspect of the disclosure, a method by base station is provided. The method includes transmitting, to a terminal, first information related to a length of a random access preamble and a first subcarrier spacing of a random access channel, transmitting, to the terminal, second information related to a second subcarrier spacing of a physical uplink shared channel (PUSCH), and receiving the random access preamble based on an offset parameter which is identified based on the length of the random access preamble, the first subcarrier spacing, and the second subcarrier spacing, wherein the offset parameter is used to identify a frequency resource of the random access channel.

In accordance with an aspect of the disclosure, a terminal is provided. The terminal includes a transceiver; and at least one processor configured to receive, from a base station, first information related to a length of a random access preamble and a first subcarrier spacing of a random access channel, receive, from the base station, second information related to a second subcarrier spacing of a physical uplink shared channel (PUSCH), identify an offset parameter based on the length of the random access preamble, the first subcarrier spacing, and the second subcarrier spacing, the offset parameter being used to identify a frequency resource of the random access channel, and transmit the random access preamble based on the offset parameter.

In accordance with an aspect of the disclosure, a base station is provided. The base station includes a transceiver, and at least one processor configured to determine a resource of a random access channel, transmit, to a terminal, first information related to a length of a random access preamble and a first subcarrier spacing of a random access channel, transmit, to the terminal, second information related to a second subcarrier spacing of a physical uplink shared channel (PUSCH), and receive the random access preamble based on an offset parameter which is identified based on the length of the random access preamble, the first subcarrier spacing, and the second subcarrier spacing, wherein the offset parameter is used to identify a frequency resource of the random access channel.

Meanwhile, in the drawings illustrating a method in embodiments, the order of description does not necessarily correspond to the order of execution, and the order relationship may be changed or executed in parallel.

Alternatively, the drawings illustrating the method of the disclosure may omit some of the elements and may include only some of the elements without impairing the essence of the disclosure.

Further, the method of the disclosure may be carried out in combination with some or all of the contents included in each embodiment without departing from the essence of the disclosure.

Computer-executable instructions or programs for implementing the functions of various embodiments of the disclosure may be recorded on a computer-readable storage medium. Corresponding functions can be realized by having a computer system read programs recorded on the recording medium and execute these programs. The so-called "computer system" herein may be a computer system embedded in the device, and may include an operating system or hardware (such as a peripheral device). The "computer-readable storage medium" may be a semiconductor recording medium, an optical recording medium, a magnetic recording medium, a short-time dynamic storage program recording medium, or any other recording media readable by a computer.

Various features or functional modules of the devices used in the above embodiments may be implemented or performed by circuitry (e.g., a single-chip or multi-chip integrated circuit). Circuits designed to perform the functions described in the present specification may include general purpose processors, digital signal processors (DSPs), application specific integrated circuits (ASICs), field programmable gate arrays (FPGAs), or other programmable logic devices, discrete Gate or transistor logic, discrete hardware components, or any combination of the above. A general-purpose processor may be a microprocessor or any existing processor, controller, microcontroller, or state machine. The above circuit may be a digital circuit or an analog circuit. In a case of new integrated circuit technology that replaces existing integrated circuits due to advances in semiconductor technology, one or more embodiments of the disclosure may also be implemented using these new integrated circuit technologies.

The skilled in the art will understand that the disclosure includes devices that are involved in performing one or more of the operations described in the disclosure. These devices may be specially designed and manufactured for the required purposes, or may also include known devices in general purpose computers. These devices have computer programs stored thereon that are selectively activated or reconfigured. Such computer programs may be stored in a device (e.g., a computer) readable medium or in any type of medium suitable for storing electronic instructions and coupled to a bus, including but not limited to any types of disks, including a floppy disk, a hard disk, an optical disk, a CD-ROM, and a magneto-optical disk, a ROM, a RAM, an erasable programmable read-only memory (EPROM), an electrically erasable programmable read-only memory (EEPROM), a flash memory, a magnetic card, or a light card. For example, a readable medium includes any medium that stores or transmits information in a readable form by a device (e.g., a computer).

The skilled in the art can understand that each block of these structural diagrams and/or block diagrams and/or flowcharts, and combinations of blocks in these structural diagrams and/or block diagrams and/or flowcharts may be implemented by computer program instructions. The skilled in the art can understand that these computer program instructions can be provided to a processor of a general-purpose computer, a professional computer, or a processor for other programmable data processing method, so that the schemes specified in one or more blocks of the structural diagrams and/or block diagrams and/or flowcharts may be executed by the processor of the computer or the computer for other programmable data processing method.

The skilled in the art can understand that various operations, methods, measures, and schemes that have been discussed in the disclosure can be alternated, changed, combined, or deleted. Further, various operations, methods that have been discussed in the disclosure, and other operations, measures, and schemes in the process can also be alternated, changed, rearranged, decomposed, combined, or deleted. Further, various operations, methods, operations, measures, and schemes in the prior art and those disclosed in the disclosure may also be alternated, changed, rearranged, decomposed, combined, or deleted.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal, the method comprising:
   receiving, from a base station, first information related to a length of a random access preamble and second information related to a first subcarrier spacing of a random access channel;
   receiving, from the base station, third information related to a second subcarrier spacing of a physical uplink shared channel (PUSCH);
   identifying an offset parameter among a plurality of offset parameters, the offset parameter corresponding to the first information related to the length of the random access preamble, the second information related to the first subcarrier spacing, and the third information related to the second subcarrier spacing;
   identifying a frequency resource of the random access channel based on the offset parameter; and
   transmitting the random access preamble based on the frequency resource.

2. The method of claim 1, wherein the first information related to the length of the random access preamble, the second information related to the first subcarrier spacing of the random access channel, and the third information related to the second subcarrier spacing of the PUSCH are used to identify a number of resource blocks of the random access channel.

3. The method of claim 2,
   wherein the number of resource blocks is "6", based on the length of the random access preamble being 839, the first subcarrier spacing being 1.25, and the second subcarrier spacing being 15,
   wherein the number of resource blocks is "3", based on the length of the random access preamble being 839, the first subcarrier spacing being 1.25, and the second subcarrier spacing being 30,
   wherein the number of resource blocks is "2", based on the length of the random access preamble being 839, the first subcarrier spacing being 1.25, and the second subcarrier spacing being 60,
   wherein the number of resource blocks is "24", based on the length of the random access preamble being 839, the first subcarrier spacing being 5, and the second subcarrier spacing being 15,
   wherein the number of resource blocks is "12", based on the length of the random access preamble being 839, the first subcarrier spacing being 5, and the second subcarrier spacing being 30, and wherein the number of resource blocks is "6", based on the length of the random access preamble being 839, the first subcarrier spacing being 5, and the second subcarrier spacing being 60.

4. The method of claim 1,
wherein the offset parameter is "7", based on the length of the random access preamble being 839, the first subcarrier spacing being 1.25, and the second subcarrier spacing being 15,
wherein the offset parameter is "1", based on the length of the random access preamble being 839, the first subcarrier spacing being 1.25, and the second subcarrier spacing being 30,
wherein the offset parameter is "133", based on the length of the random access preamble being 839, the first subcarrier spacing being 1.25, and the second subcarrier spacing being 60,
wherein the offset parameter is "12", based on the length of the random access preamble being 839, the first subcarrier spacing being 5, and the second subcarrier spacing being 15,
wherein the offset parameter is "10", based on the length of the random access preamble being 839, the first subcarrier spacing being 5, and the second subcarrier spacing being 30, and
wherein the offset parameter is "7", based on the length of the random access preamble being 839, the first subcarrier spacing being 5, and the second subcarrier spacing being 60.

5. A method performed by a base station, the method comprising:
transmitting, to a terminal, first information related to a length of a random access preamble and second information related to a first subcarrier spacing of a random access channel;
transmitting, to the terminal, third information related to a second subcarrier spacing of a physical uplink shared channel (PUSCH); and
receiving the random access preamble based on a frequency resource associated with an offset parameter, the offset parameter corresponding to the first information related to the length of the random access preamble, the second information related to the first subcarrier spacing, and the third information related to the second subcarrier spacing among a plurality of offset parameters.

6. The method of claim 5, wherein the first information related to the length of the random access preamble, the second information related to the first subcarrier spacing of the random access channel, and the third information related to the second subcarrier spacing of the PUSCH are used to identify a number of resource blocks of the random access channel.

7. The method of claim 6,
wherein the number of resource blocks is "6", based on the length of the random access preamble being 839, the first subcarrier spacing being 1.25, and the second subcarrier spacing being 15,
wherein the number of resource blocks is "3", based on the length of the random access preamble being 839, the first subcarrier spacing being 1.25, and the second subcarrier spacing being 30,
wherein the number of resource blocks is "2", based on the length of the random access preamble being 839, the first subcarrier spacing being 1.25, and the second subcarrier spacing being 60,
wherein the number of resource blocks is "24", based on the length of the random access preamble being 839, the first subcarrier spacing being 5, and the second subcarrier spacing being 15,
wherein the number of resource blocks is "12", based on the length of the random access preamble being 839, the first subcarrier spacing being 5, and the second subcarrier spacing being 30, and
wherein the number of resource blocks is "6", based on the length of the random access preamble being 839, the first subcarrier spacing being 5, and the second subcarrier spacing being 60.

8. The method of claim 5,
wherein the offset parameter is "7", based on the length of the random access preamble being 839, the first subcarrier spacing being 1.25, and the second subcarrier spacing being 15,
wherein the offset parameter is "1", based on the length of the random access preamble being 839, the first subcarrier spacing being 1.25, and the second subcarrier spacing being 30,
wherein the offset parameter is "133", based on the length of the random access preamble being 839, the first subcarrier spacing being 1.25, and the second subcarrier spacing being 60,
wherein the offset parameter is "12", based on the length of the random access preamble being 839, the first subcarrier spacing being 5, and the second subcarrier spacing being 15,
wherein the offset parameter is "10", based on the length of the random access preamble being 839, the first subcarrier spacing being 5, and the second subcarrier spacing being 30, and
wherein the offset parameter is "7", based on the length of the random access preamble being 839, the first subcarrier spacing being 5, and the second subcarrier spacing being 60.

9. A terminal in a wireless communication system, the terminal comprising:
a transceiver; and
at least one processor coupled with the transceiver and configured to:
receive, from a base station, first information related to a length of a random access preamble and second information related to a first subcarrier spacing of a random access channel,
receive, from the base station, third information related to a second subcarrier spacing of a physical uplink shared channel (PUSCH),
identify an offset parameter among a plurality of offset parameters, the offset parameter corresponding to the first information related to the length of the random access preamble, the second information related to the first subcarrier spacing, and the third information related to the second subcarrier spacing,
identify a frequency resource of the random access channel based on the offset parameter, and
transmit the random access preamble based on the frequency resource.

10. The terminal of claim 9, wherein the first information related to the length of the random access preamble, the second information related to the first subcarrier spacing of the random access channel, and the third information related to the second subcarrier spacing of the PUSCH are used to identify a number of resource blocks of the random access channel.

11. The terminal of claim 10,
- wherein the number of resource blocks is "6", based on the length of the random access preamble being 839, the first subcarrier spacing being 1.25, and the second subcarrier spacing being 15,
- wherein the number of resource blocks is "3", based on the length of the random access preamble being 839, the first subcarrier spacing being 1.25, and the second subcarrier spacing being 30,
- wherein the number of resource blocks is "2", based on the length of the random access preamble being 839, the first subcarrier spacing being 1.25, and the second subcarrier spacing being 60,
- wherein the number of resource blocks is "24", based on the length of the random access preamble being 839, the first subcarrier spacing being 5, and the second subcarrier spacing being 15,
- wherein the number of resource blocks is "12", based on the length of the random access preamble being 839, the first subcarrier spacing being 5, and the second subcarrier spacing being 30, and
- wherein the number of resource blocks is "6", based on the length of the random access preamble being 839, the first subcarrier spacing being 5, and the second subcarrier spacing being 60.

12. The terminal of claim 9,
- wherein the offset parameter is "7", based on the length of the random access preamble being 839, the first subcarrier spacing being 1.25, and the second subcarrier spacing being 15,
- wherein the offset parameter is "1", based on the length of the random access preamble being 839, the first subcarrier spacing being 1.25, and the second subcarrier spacing being 30,
- wherein the offset parameter is "133", based on the length of the random access preamble being 839, the first subcarrier spacing being 1.25, and the second subcarrier spacing being 60,
- wherein the offset parameter is "12", based on the length of the random access preamble being 839, the first subcarrier spacing being 5, and the second subcarrier spacing being 15,
- wherein the offset parameter is "10", based on the length of the random access preamble being 839, the first subcarrier spacing being 5, and the second subcarrier spacing being 30, and
- wherein the offset parameter is "7", based on the length of the random access preamble being 839, the first subcarrier spacing being 5, and the second subcarrier spacing being 60.

13. A base station in a wireless communication system, the base station comprising:
- a transceiver; and
- at least one processor coupled with the transceiver and configured to:
  - determine a resource of a random access channel,
  - transmit, to a terminal, first information related to a length of a random access preamble and second information related to a first subcarrier spacing of the random access channel,
  - transmit, to the terminal, third information related to a second subcarrier spacing of a physical uplink shared channel (PUSCH), and
  - receive the random access preamble based on a frequency resource associated with an offset parameter, the offset parameter corresponding to the first information related to the length of the random access preamble, the second information related to the first subcarrier spacing, the third information related to the second subcarrier spacing among a plurality of offset parameters.

14. The base station of claim 13, wherein the first information related to the length of the random access preamble, the second information related to the first subcarrier spacing of the random access channel, and the third information related to the second subcarrier spacing of the PUSCH are used to identify a number of resource blocks of the random access channel.

15. The base station of claim 14,
- wherein the offset parameter is "7", based on the length of the random access preamble being 839, the first subcarrier spacing being 1.25, and the second subcarrier spacing being 15,
- wherein the offset parameter is "1", based on the length of the random access preamble being 839, the first subcarrier spacing being 1.25, and the second subcarrier spacing being 30,
- wherein the offset parameter is "133", based on the length of the random access preamble being 839, the first subcarrier spacing being 1.25, and the second subcarrier spacing being 60,
- wherein the offset parameter is "12", based on the length of the random access preamble being 839, the first subcarrier spacing being 5, and the second subcarrier spacing being 15,
- wherein the offset parameter is "10", based on the length of the random access preamble being 839, the first subcarrier spacing being 5, and the second subcarrier spacing being 30,
- wherein the offset parameter is "7", based on the length of the random access preamble being 839, the first subcarrier spacing being 5, and the second subcarrier spacing being 60,
- wherein the number of resource blocks is "6", based on the length of the random access preamble being 839, the first subcarrier spacing being 1.25, and the second subcarrier spacing being 15,
- wherein the number of resource blocks is "3", based on the length of the random access preamble being 839, the first subcarrier spacing being 1.25, and the second subcarrier spacing being 30,
- wherein the number of resource blocks is "2", based on the length of the random access preamble being 839, the first subcarrier spacing being 1.25, and the second subcarrier spacing being 60,
- wherein the number of resource blocks is "24", based on the length of the random access preamble being 839, the first subcarrier spacing being 5, and the second subcarrier spacing being 15,
- wherein the number of resource blocks is "12", based on the length of the random access preamble being 839, the first subcarrier spacing being 5, and the second subcarrier spacing being 30, and
- wherein the number of resource blocks is "6", based on the length of the random access preamble being 839, the first subcarrier spacing being 5, and the second subcarrier spacing being 60.

* * * * *